US007537203B2

(12) United States Patent  (10) Patent No.: US 7,537,203 B2
DeWitt et al.  (45) Date of Patent: May 26, 2009

(54) METHOD AND APPARATUS FOR PROCESSING MAIL OBTAIN IMAGE DATA OF CONTENTS

(75) Inventors: Robert R. DeWitt, Marlton, NJ (US); George L. Hayduchok, Mount Holly, NJ (US)

(73) Assignee: Opex Corporation, Morrestown, NJ (US)

( * ) Notice: Subject to any disclaimer, the term of this patent is extended or adjusted under 35 U.S.C. 154(b) by 902 days.

(21) Appl. No.: 10/862,021

(22) Filed: Jun. 4, 2004

(65) Prior Publication Data

US 2005/0018214 A1 Jan. 27, 2005

Related U.S. Application Data

(60) Provisional application No. 60/476,532, filed on Jun. 7, 2003.

(51) Int. Cl.
*B65H 39/00* (2006.01)
(52) U.S. Cl. .................. 270/52.01; 270/52.02
(58) Field of Classification Search ............. 270/52.02, 270/58.23, 58.29, 58.31, 58.32, 58.33, 58.34, 270/45, 51
See application file for complete search history.

(56) References Cited

U.S. PATENT DOCUMENTS

| 3,143,100 | A | 8/1964 | Krupotich |
| 3,266,626 | A | 8/1966 | Simjian |
| 3,884,010 | A | 5/1975 | Bardo et al. |
| 4,124,968 | A | 11/1978 | Stevens et al. |
| 4,233,800 | A | 11/1980 | Long et al. |
| 4,333,300 | A | 6/1982 | Russell |
| 4,353,197 | A | 10/1982 | Stevens et al. |
| 4,576,287 | A | 3/1986 | Bingham et al. |
| 4,616,815 | A * | 10/1986 | Vijuk ................... 270/45 |
| 4,649,694 | A | 3/1987 | Haley |
| 4,863,037 | A * | 9/1989 | Stevens et al. ........... 53/381.3 |
| 4,866,908 | A * | 9/1989 | Kunne et al. ............ 53/381.6 |
| 4,893,454 | A | 1/1990 | Russell |
| 4,934,892 | A | 6/1990 | Smith et al. |

(Continued)

OTHER PUBLICATIONS

Model 2050 Master Workstation Remittance System 2000, pp. 1-4, Lundy, Recognitiion Equipment Incorporated, Copyright 1992.

(Continued)

*Primary Examiner*—Gene Crawford
*Assistant Examiner*—Leslie A Nicholson, III
(74) *Attorney, Agent, or Firm*—Stephen H. Eland; Dann, Dorfman, Herrell & Skillman

(57) ABSTRACT

A method and apparatus for processing mail is provided. Mail is placed into an input bin having a conveyor that conveys the mail towards a feeder. The feeder serially feeds the envelopes by engaging the lead envelope in the stack of mail and displacing the lead envelope transverse the stack of mail. The mail is then cut on a side edge and the top edge to cut open each envelope. A transport conveys the cut envelopes to an extractor. The extractor opens the edge-severed mail and presents the contents of the envelopes to an operator who manually extracts the contents. The operator drops the extracted contents onto a conveyor that conveys the contents to an imaging station. The contents are automatically separated and imaged to obtain image data for the contents. The contents are then sorted into a plurality of output bins.

22 Claims, 13 Drawing Sheets

U.S. PATENT DOCUMENTS

| | | | |
|---|---|---|---|
| 5,052,168 | A | 10/1991 | DeWitt et al. |
| 5,052,875 | A | 10/1991 | Miller et al. |
| 5,096,360 | A | 3/1992 | Nelson |
| 5,134,834 | A | 8/1992 | Hayduchok |
| 5,156,515 | A | 10/1992 | Charron et al. |
| 5,175,979 | A | 1/1993 | Van Der Werff et al. |
| 5,178,224 | A | 1/1993 | DiGuilo et al. |
| 5,293,431 | A | 3/1994 | Hayduchok et al. |
| 5,310,062 | A * | 5/1994 | Stevens et al. .............. 209/584 |
| 5,440,861 | A | 8/1995 | Lund |
| 5,460,273 | A | 10/1995 | Stevens et al. |
| 5,558,232 | A | 9/1996 | Stevens et al. |
| 5,655,668 | A | 8/1997 | Drenth |
| 5,675,671 | A | 10/1997 | Hayduchok et al. |
| 5,727,692 | A | 3/1998 | Large et al. |
| 5,810,173 | A | 9/1998 | Stevens et al. |
| 5,842,577 | A | 12/1998 | Stevens et al. |
| 5,924,840 | A | 7/1999 | Charron et al. |
| 6,112,902 | A | 9/2000 | Hayduchok et al. |
| 6,151,422 | A | 11/2000 | Hayduchok et al. |
| 6,219,647 | B1 | 4/2001 | Hidding et al. |
| 6,230,471 | B1 | 5/2001 | Robertson et al. |
| 6,311,846 | B1 * | 11/2001 | Hayduchok et al. .......... 209/3.3 |
| 6,360,447 | B1 | 3/2002 | Foley |
| 6,505,534 | B2 | 1/2003 | Robertson et al. |
| 2006/0219601 | A1 * | 10/2006 | Babanats et al. ............. 209/3.3 |
| 2008/0054544 | A1 * | 3/2008 | Calverley et al. ........ 270/58.02 |

OTHER PUBLICATIONS

DocuScan 9000, 3 pages of product brochure, BancTec.
Imaging Business Machines provides Solutions, 4 pages of product brochure.
KV-S2055 High Speed Scanner, 1 page product brochure, Copyright 1998 Matsushita Electric Corproation of America.
LS 515 Document Reader-Scanner, 1 page product brochure.
IQ Sort Programmable Video Document Sorting Workstation, 2 page product brochure, Copyright 1994 Opex Corporation.
Open Scan product brochure, 4 pages product brochure.
U.S. Appl. No. 09/904,471 filed Jul. 13, 2001 entitled "Method and Apparatus for Processing Outgoing Bulk Mail".
U.S. Appl. No. 10/007,317 filed Nov. 5, 2001, entitled "Method and Apparatus for Sorting and Acquiring Image Data for Documents".
U.S. Appl. No. 10/931,529 filed Aug. 31, 2004, entitled "Method and Apparatus for Processing Mail to Obtain Image Data of Contents".
U.S. Appl. No. 10/931,530 filed Aug. 31, 2004, entitled "Method and Apparatus for Processing Mail to Obtain Image Data of Contents".
U.S. Appl. No. 10/348,358 filed Jan. 21, 2003, entitled "Method and Apparatus for Processing Envelopes Containing Contents".

* cited by examiner

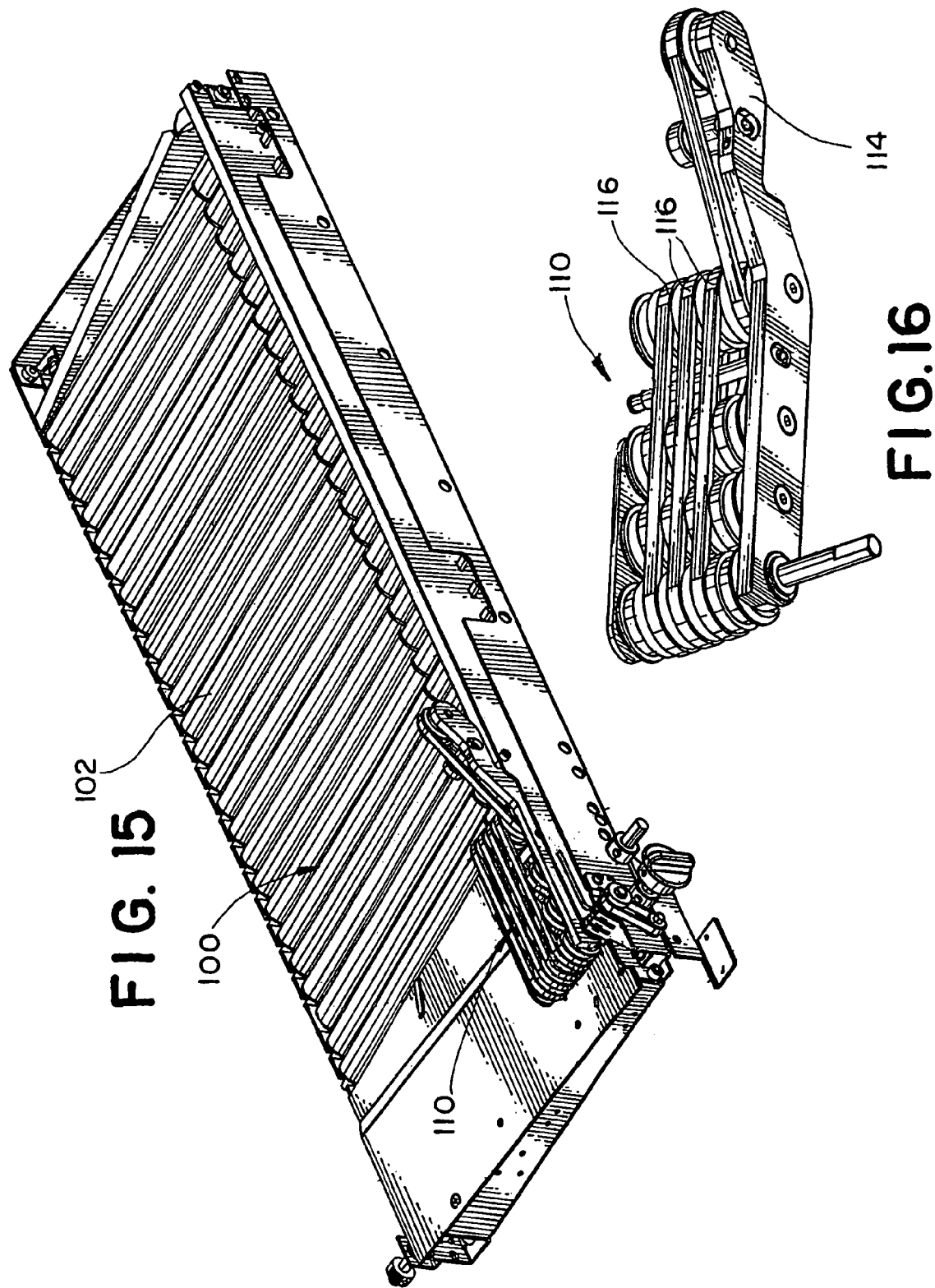

METHOD AND APPARATUS FOR PROCESSING MAIL OBTAIN IMAGE DATA OF CONTENTS

PRIORITY CLAIM

This application claims priority to U.S. Provisional Patent Application No. 60/476,532, filed Jun. 7, 2003, which in hereby incorporated by reference.

FIELD OF THE INVENTION

The present invention relates to the field of processing documents to obtain image data for the documents. More specifically, the present invention relates to a workstation operable to process documents by dropping the contents onto a conveyor that conveys the documents to a scanner. The present invention also relates to processing mail, such as envelopes having contents, wherein opened envelopes are presented to an operator so the operator can extract the contents from the envelopes.

BACKGROUND OF THE INVENTION

Automated and semi-automated machines have been employed for processing documents such as bulk mail. Due to the large quantity of mail received by many companies, there has long been a need for efficient sorting of incoming mail.

Further, in many instances it is desirable to obtain image data of the documents received in the mail. However, often the documents are folded and/or the documents received in a batch of mail are random sizes. In order to scan these documents, it is typically necessary to spend considerable time to manually prepare the documents so that the documents can be automatically fed into a scanner. This processing is inefficient, thereby increasing the overall cost of processing the mail and obtaining image data of the documents in the mail.

SUMMARY OF THE DESCRIPTION

Accordingly, a method and apparatus are provided for processing mail to efficiently handle the mail and obtain image data of the documents. Preferably, the present invention provides an apparatus that readily processes a variety of document types to obtain image data for the documents. For instance, preferably the apparatus accepts various sized documents and transports the documents to an imaging device, such as a scanner, to obtain image data. Preferably, the apparatus also allows the processing of folded or creased documents, and particularly groups of folded or stacked documents.

A method and apparatus are also provided that allow processing mixed mail with minimal or no preparation of the mail. A document or packet of documents can simply be dropped onto a conveyor, which conveys the document or documents to a feeder that serially feeds the documents downstream for further processing. One type of further processing uses a scanner. The feeder separates and serially feeds the documents to the scanner, which scans the documents to obtain image data for each document.

According to another aspect, a method and apparatus is provided for efficiently processing documents according to various information that can be identified for the documents on a job, batch, transaction, or document basis. Further, an interface is provided that allows the operator to intervene to supplement or amend the scanned information with additional information that may be tagged to the documents.

Yet another aspect relates to a feeder that is operable to accommodate mail with little or no pre-processing. The feeder is operable to receive packets of envelopes conveyed in a generally horizontal orientation, separate the documents from one another and serially feed the documents. The feeder includes a feed belt disposed generally parallel to a transport path along with the packet of documents are conveyed. The feeder also includes an angled feed arm that projects upwardly and outwardly over the transport path, forming an acute angle with the incoming transport path.

DESCRIPTION OF THE DRAWINGS

The foregoing summary as well as the following description will be better understood when read in conjunction with the figures in which:

FIG. 10 is a schematic side view of an uncreasing element of the imaging station illustrated in FIG. 3.

FIG. 11 is a screen shot of an operator display of the apparatus illustrated in FIG. 1, illustrating a view sorted according to transaction.

FIG. 12 is a screen shot of an operator display of the apparatus illustrated in FIG. 1, illustrating a view sorted according to document sequence.

FIG. 15 is a fragmentary perspective view of the drop feeder illustrated in FIG. 3.

FIG. 16 is an enlarged fragmentary perspective view of the feeder of FIG. 2.

DETAILED DESCRIPTION OF THE PREFERRED EMBODIMENT

Figure 1:
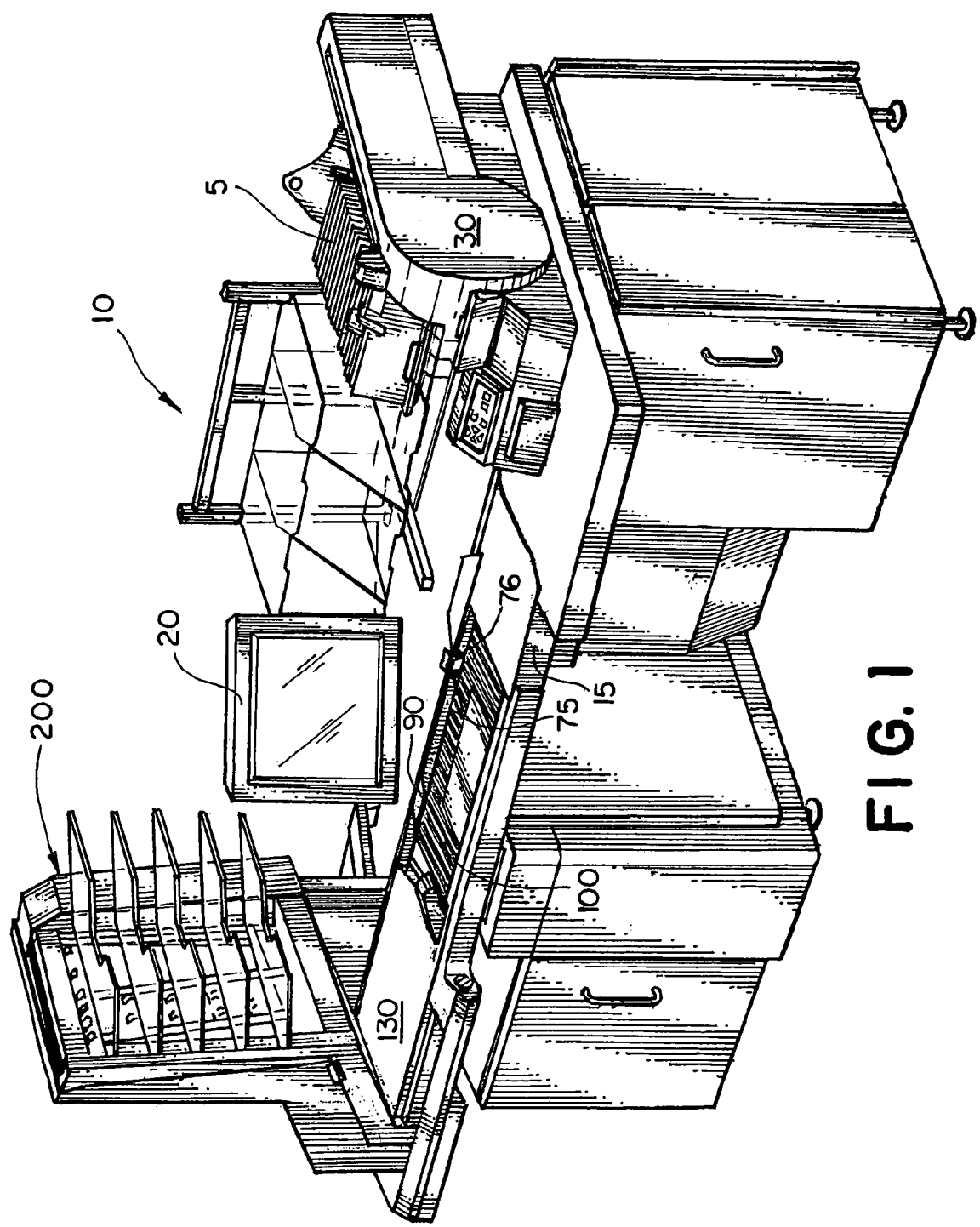
FIG. 1 is a perspective view of a mail processing apparatus.

Referring now to the figures in general and to FIG. 1 in particular, a semi-automated mail processing workstation 10 is illustrated. The workstation 10 processes mail by severing one or more edges of each envelope in a stack of mail, and presenting the edge-severed envelopes one at the time to an operator who removes the documents from the envelope by hand. The operator can then drop the extracted documents individually or in stacks onto a conveyor that conveys the documents to an imaging station. The imaging station separates the documents, serially feeding the documents to an imager that obtains image data for the documents. The documents are then sorted into one or more output bins.

Brief Overview

A general overview of the flow of mail is as follows. Initially, a stack of envelopes containing documents, referred to as a job, is placed into an input bin. A feeder 30 removes the lead envelope 5 from the front of the stack and transfers the envelope to a feed tray.

The envelope 5 in the feed tray is edge-justified by a plurality of opposing rollers. From the feed tray, the envelope 5 drops into a side cutter, which severs the side edge of the envelope if desired. From the side cutter, the envelope drops into a shuttle. The shuttle moves vertically to adjust the height of the top edge of the envelope to account for variations in the height of the different envelopes in the job. The shuttle moves vertically until the height of the top edge of the envelope 5 is within an acceptable range for advancing the envelope into a top cutter. The envelope is then transported to the top cutter, which severs the top edge of the envelope 5.

From the top cutter the envelope is advanced to an extraction station 70. The extraction station 70 pulls apart the front and back faces of the envelope to present the contents of the envelope for removal. An operator then manually removes the contents from the envelope 5.

After the operator removes the documents from the envelope 5, the apparatus 10 automatically advances the envelope to a verifier 90. The verifier 90 verifies that all of the documents were removed from the envelope before the envelope is discarded. From the verifier 90 the envelope is conveyed into a waste container. Alternatively, the envelope 5 may be manually removed and imaged at the imaging station 130.

Returning to the flow of the documents, after the documents are extracted at the extraction station, the operator unfolds as needed and drops or places the extracted documents onto a drop conveyor 100 that transports the documents toward an imaging station 130. An imaging entry feeder 110 receives the documents from the drop conveyor 100 and controls the feeding of the documents into the imaging station 130. The image entry feeder 110 is configured to receive and feed documents of various sizes and condition. For instance, frequently documents are folded in an envelope. When the documents are extracted and opened up, the documents are creased or folded so that they do not lie flat. The feeder 110 is preferably configured to receive such creased or folded documents and serially feed the folded documents into the imaging station 130 with minimal manual preparation by the operator.

The imaging station 130 includes an imager 150 that obtains image data for each document as the document is conveyed past the device. For instance, preferably the imager 150 is a scanner that obtains gray scale or color image data representing an image of each document. The scanner scans each document at a plurality of points as the document is conveyed past the scanner. The information for each document is stored in a data file for each document so that the image data can be accessed at a later time.

From the imaging device, preferably an imaging transport 170 conveys the documents to a sorting station 200 that sorts the documents into a plurality of output bins 205. The documents can be sorted in a variety of ways. For instance, the documents can be sorted based on document information obtained from the image data received at the imaging station 130. Alternatively, the operator may indicate information regarding a document before it is scanned, so that the document is sorted according to the information indicated by the operator. Yet another alternative is that the documents may be stacked into one or more bins simply based on the order in which the documents are processed.

Since many of the documents may be creased, ordinarily the documents will not readily stack in a compact manner so that relatively fewer creased documents can be discharged into a bin before the bin is full. Accordingly, preferably, the documents are processed by an uncreaser 180, which is an element that reduces the creasing or folds in the documents. The uncreaser flattens or straightens the documents so that they lay more flatly in the output bins so that more documents can be discharged into a bin before the bin is full.

A controller controls the processing of the mail in response to signals received from various sensors at various locations of the workstation 10 and in response to parameters set for the job by the operator. For instance, in response to an indication from a sensor in the feed tray that there is no envelope in the feed tray, the controller sends a signal to the feeder 30 indicating that an envelope should be fed from the input bin to the feed tray. Similarly, in response to an indication from a sensor in the shuttle that there is no envelope in the shuttle, the controller sends a signal to the feed tray indicating that an envelope should be dropped from the feed tray into the shuttle.

The workstation is divided into numerous functionally separate sections, which include: a feeding station 30, a side cutting station, a top cutting station, the extraction station 70, the verification station 90, the imaging station 110, and the sorting station 200. In most cases, the controller controls the operation of the various sections independently from each other. This independence allows several operations to proceed simultaneously or asynchronously as required. As a result, a slow down in one section does not necessarily slow down all of the other sections.

In addition, preferably the operation of the apparatus from the drop conveyor through the sorting station are controlled separately from the operation of the other stations. Further, preferably, an operator interface is provided so that the operator can intervene to control the processing of the documents. Specifically, preferably a touch screen display 20 is provided that allows the operator to enter various information regarding the documents.

Configuration of the Work Station

As can be seen in FIG. 1, preferably the work station 10 is configured so that an operator working at the workstation has ready access to each working area. A seating area 15 at the front of the apparatus is centrally located, and the different stations are disposed around the seating area with the paper path flowing in a manner that the documents remain within easy access of the operator at the seating area.

Specifically, preferably, the feeding station 30 is disposed adjacent the right side, however, the feeding station can be located on the left side if desired. Preferably, the feeding station is within arm's reach of the operator from the seating area 15. Accordingly, preferably the distance from the seating area to the feeding station is no longer than one half the overall width of the work station, so that the operator can readily access the feeding station 30 from the seating area. From the feeding station 30, the mail pieces are fed along a document path that extends across the workstation along the width of the work station, intermediate the front and rear edges of the work station to the extraction station 70. Preferably, the extraction station is substantially aligned with the seating area 15 relative to the right and left edges of the work station so that the operator can readily grasp the mail at the extractor during operation. For instance, preferably the extraction station is generally centered between the right and left edges of the workstation, and preferably the center of the seating area is also generally centered between the right and left edges of the work station. In other words, preferably the seating area is disposed a distance from the left hand edge of the work station that is substantially similar to the distance that the extraction station is disposed from the right hand edge of the work station.

The drop conveyor 100 is preferably located adjacent the front edge of the work station, and is disposed between the extraction station 70 and the seating area 15 so that the operator reaches over a portion of the drop conveyor to grasp documents at the extraction station. More specifically, preferably a portion of the drop conveyor 100 is disposed adjacent the seating area 15 at the front edge of the work station. In this way, the operator can readily view, unfold and drop documents from the extraction station 70 onto the drop conveyor 100 when pulling the documents back toward himself/herself.

Preferably, the imaging station is disposed adjacent the front edge of the work station on the side of the work station opposite the side on which the feeding station 30 is disposed. Accordingly, the drop conveyor 100 conveys the dropped documents away from adjacent the seating area 15, along a path that is generally parallel to the front edge of the work station. Preferably, the imaging station 130 is disposed a distance from the seating area that is less than half the width of the work station so that the operator may readily access documents at the imaging station. In addition, preferably the document path from the imaging station 130 to the output bins 205 returns toward the seating area so that the output bins are spaced from the seating area a distance that is less than half the width of the work station. In this way, the output bins 205 are disposed conveniently near the operator at the seating area, so that the operator can readily remove processed documents from the output bins while the operator is at the seating area.

Details of the Stations

Feeding and Edge Cutting Stations

The feeding station 30 includes an input bin and a feeder. The input bin is configured to receive a stack of mail and convey it to the feeder. The feeder comprises a pivoting arm with a suction cup that grasps an envelope from the stack of mail and transports the piece to a side cutting station. In this way, the feeder 35 serially feeds mail from the stack of mail.

The side cutting station includes a plurality of drive rollers and opposing idler rollers. As the envelope passes between the rollers a rotary knife severs the side edge of the envelope. The severed edge drops down a scrap chute into a waste container.

From the side cutting station, the envelopes are top edge-justified so that the top edge remains at a consistent height. The envelopes may be justified by a pair of rollers to drive the envelopes upwardly against a stop at a predetermined height. However, such a roller justifier is typically limited to justifying envelopes that are similar in height. If there is too much variation among the envelopes in a batch of mail the justifier may not be able to properly justify the envelopes. For instance, if an envelope in a batch is unusually high, the top edge of the envelope may be positioned too high as it enters the justifier so that it causes a jam. If the envelope is unusually low, the top edge of the envelope may not engage the justifier rollers so that the envelope is not justified.

Accordingly, in order to accommodate a variety of envelopes, preferably the apparatus includes a shuttle that moves up and down to position the top edge of each envelope at approximately the proper height. The envelopes then enter the top-edge justifier to justify the top edge of the envelopes. The shuttle is a bin that receives each envelope and moves up or down as necessary to adjust the height of the top edge of each envelope as necessary depending upon the height of each envelope.

After the envelopes are top edge-justified, the envelopes are conveyed to a top cutting station that severs the top edge of the envelopes. In this way, the top and leading edge of each envelope is cut by the two cutting stations. Optionally, the side cutting station can be configured so that both sides of each envelope is severed. Yet another option is to eliminate or disable the side cutters so that only the top edge of the envelopes is opened.

Extraction Station

The extraction station 70 operates to pull apart the faces of the edge-severed envelopes and present the contents so that an operator can easily remove the documents. After the operator removes the contents, a sensor sends a signal to the controller that the contents have been extracted. The empty envelope is then transported to the verification station 90 and another envelope is fed to the extraction station 70.

Figure 9:
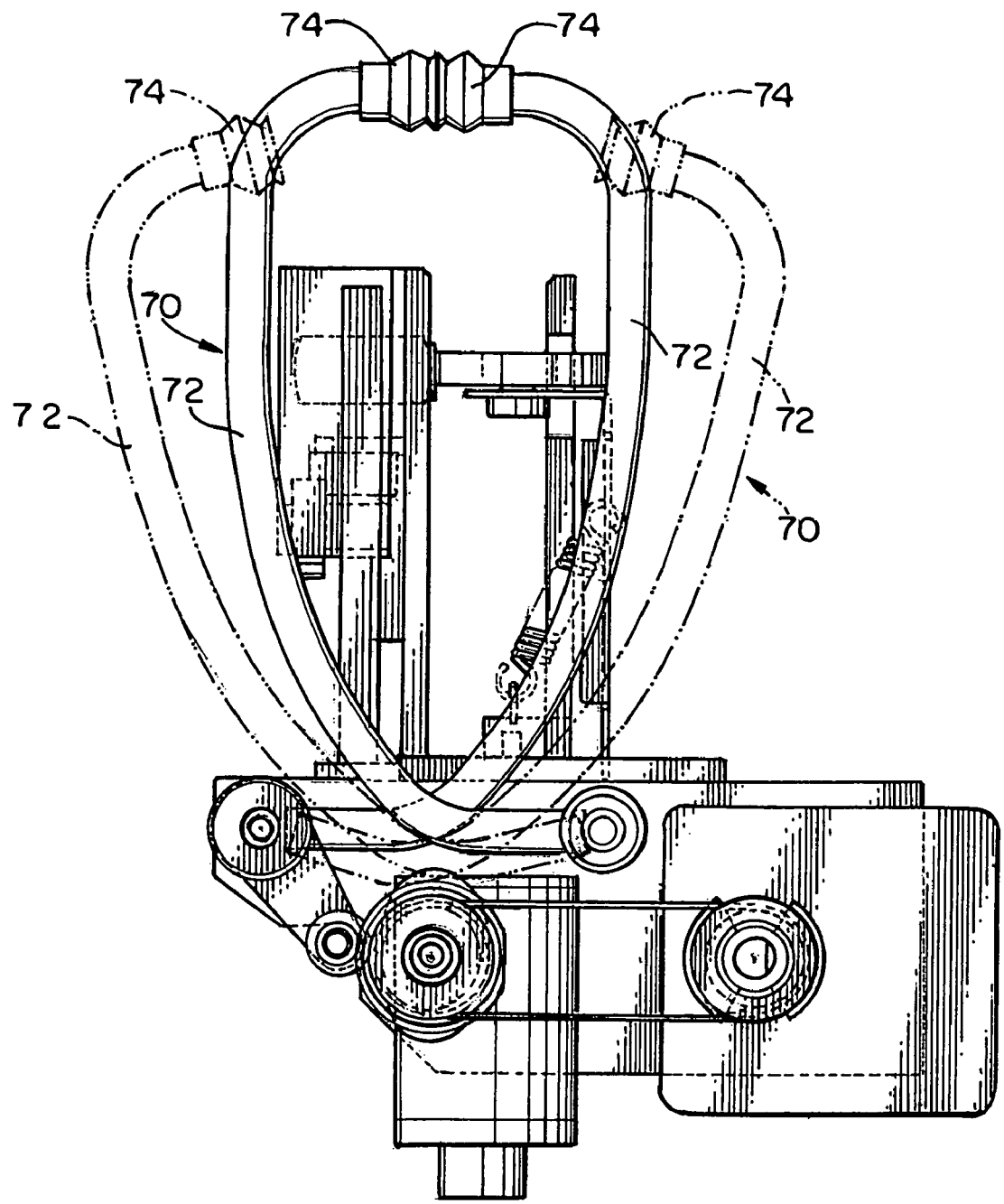
FIG. 9 is an enlarged fragmentary side view of an extraction station of the apparatus illustrated in FIG. 1.

Referring now to FIG. 9, the extraction station 70 includes a pair of opposing vacuum suction cups 74 mounted on two pivotal extractor arms 72. The suction cups 74 are connected to a vacuum pump. In FIG. 9, the extractor arms 72 are shown in two alternative positions. In the first position, the extractor arms are pivoted away from one another. In the second position the extractor arms are pivoted toward one another.

As shown in FIG. 1 the extraction station 70 is positioned in front of the seating area 15 intermediate the front and rear edges of the work station. Before an envelope enters the extraction station, the extractor arms 72 are pivoted away from one another. When the envelope enters the extractor, the arms 72 pivot toward one another and negative pressure is supplied to the suction cups so that the suction cups engage the faces of the envelope. The arms then pivot away from one another pulling apart the faces of the envelope, which have been severed along the top edge and preferably the side edge (see FIG. 9). The operator can then remove the contents of the envelope.

The document transport pinches the envelope between idler rollers and a belt. Therefore, when the extractor arms 72 pull apart the faces of the envelope, the envelope and its contents remain pinched between the idler rollers and the belt. To remove the contents, the operator must pull the contents with enough force to overcome the friction between the envelope and the contents caused by the pinching action of the extraction transport. In addition, this friction is maintained until the bottom edge of the contents is pulled past the pinch point. The extraction station 70 is preferably configured to operate in three different modes for determining whether the contents have been extracted from the envelope: removal mode, differential mode, and content activation mode.

The simplest mode is removal mode. An optical sensor 75 is located adjacent the extractor arms 72 in front of the extractor arms. When the operator removes the contents from the envelope the contents pass over the sensor 75 and the sensor detects the presence of the contents. A signal is then sent to the controller indicating that the contents were removed. The controller then controls the document transport to advance the envelope from the extraction station 70 to the verifier 90. In addition, an envelope is advanced to the extraction station. The envelope is advanced from the extraction station as long as some of the contents from the envelope are passed over the sensor 75, even if some of the contents remain in the envelope.

In the differential mode, an optical sensor 76 measures the thickness of the envelope immediately after the extractor arms pull apart the faces of the envelope so that the thickness of the envelope is measured before the operator extracts the contents. The optical sensor 76 continuously detects the thickness of the envelope and its contents, and compares the thickness with the initial thickness reading. If the difference in thickness is greater than a predetermined limit, a signal is sent to the controller indicating that the contents were removed from the envelope. The controller then advances the envelope to the verifier 90 and advances an envelope to the extractor. Preferably, the workstation includes a second optical sensor similar to the first sensor 76. The second sensor monitors the thickness of the envelope in the same way as the first sensor 76. When two sensors are employed, the measurements from the two sensors are averaged and compared against the predetermined limit to determine whether the contents were extracted.

If the operator removes all of the contents from the envelope, but the differential thickness is not greater than the predetermined limit, the envelope will not be advanced. In such instances the operator can advance the empty envelope by pressing an override button (not shown). Pressing the button operates to convey the empty envelope to the verifier 90 and convey an envelope to the extractor.

The content activation mode is like the differential mode in that the sensor 76 continuously detects the thickness of the envelope and its contents. However, in the content activation mode, the thickness detected by the sensor 76 is compared to a thickness standard based on the thickness of an envelope and a variation tolerance. If the sensor 76 detects a thickness that is less than the thickness standard, a signal is sent to the controller indicating that the contents were removed from the envelope. The envelope is then advanced to the verifier 90 and an envelope is conveyed to the extraction station 70. Preferably, two sensors 76 are employed, both of which monitor the thickness of the envelope as described above. When two sensors are employed, the measurements from the two sensors are averaged and the average is compared against the thickness standard.

If the operator removes the contents from the envelope, but the thickness detected by the sensor is not below the thickness standard the envelope does not advance. In such instances, the operator can advance the empty envelope by pressing the override button. In response to pressing the button, the empty envelope is conveyed to the verifier 90 and an envelope is conveyed to the extraction station 70.

The thickness standard used in the content activation mode can be determined in several ways. For example, the thickness standard can be based on the first envelope in a job. However, preferably, the thickness standard is calculated based on the average thickness of the envelopes processed in a job. In other words, the thickness standard is continuously updated based on an average of the thickness of the empty envelopes processed in a job. The thickness standard is then calculated based on the thickness of the empty envelope(s) and a predetermined variation tolerance.

Verification Station

The verification station 90 checks the thickness of each envelope to ensure that all of the contents have been removed from the envelope before the envelope is discarded into the waste container 25. The verifier 90 can use an optical sensor to check the thickness of the envelope, similar to the optical sensor or sensors used by the extraction station 70. However, the verifier preferably checks the thickness of the envelope by measuring the distance between the outer surfaces of the envelope faces. To measure this distance, the verifier 90 includes a rotary variable inductive transducer (RVIT).

To determine a zero thickness reference value, an empty envelope is fed to the verifier, and the sensor takes a measurement corresponding to the thickness of the empty envelope. The status of subsequent envelopes are determined based on the zero thickness reference value.

Alternatively, the reference value used by the verifier 90 to check the envelopes is calculated based on the average thickness of the previous envelopes and a variation tolerance, similar to the method described above for determining a thickness standard for the extraction step in the content activation mode. However, in the present instance, the calculation of the reference value differs from the calculation of the standard used in the extraction step. When calculating the reference value for the verifier 90, if the measured thickness of an empty envelope is greater than the current reference value, the thickness measurement for the envelope is not factored into the running average. For example, when calculating the thickness reference for the 100th envelope in a job, if the thickness of the 90th empty envelope was thicker than the reference value based on the previous sixteen envelopes, the thickness of the 90th envelope would not be included in the average used to calculate the reference value for the 100th envelope.

If the verifier 90 measures a thickness that is greater than the reference value, then a signal is sent to the controller indicating that the envelope in the verifier 90 is not empty. An indicator light (not shown) is lit indicating to the operator that the envelope at the verifier should be removed and checked to ensure that all of the contents were removed. A verifier sensor adjacent the RVIT sensor detects the presence of the envelope in the verifier 90. Until the operator removes the envelope from the verifier, the document transport will not advance any envelopes, regardless of whether the envelope in the extraction station 70 is empty.

If the verifier 90 detects a thickness that is less than the reference value, a signal is sent to the controller indicating that the envelope at the verifier is empty. The controller then activates the document transport to advance the envelope out of the extractor and into a trash chute that discards the envelope into the waste container beneath the verifier 90.

The operation of the feeding station 30, side and top cutting stations 40, 50 and extraction station 70 are similar to the operation of the apparatus described in U.S. Pat. No. 6,230,471, which is owned by Opex Corporation, who is also the assignee of the present patent application. U.S. Pat. No. 6,230,471 is hereby incorporated herein by reference. In addition, alternative feeding and cutting stations could be incorporated into the present apparatus. For instance, pending U.S. patent application Ser. No. 10/348,358 describes a mail processing apparatus having an alternative feeding station and edge cutting area that could be incorporated into the present apparatus in place of the feeding and edge cutting stations described above. Application Ser. No. 10/348,358 is hereby incorporated herein by reference.

The following description discusses the processing and imaging of documents that have been extracted from opened envelopes in the manner discussed above. However, in certain applications, the apparatus is operable to process documents without using the extraction features of the apparatus. For instance, the apparatus may be used to process a batch of documents that have been previously extracted, such as documents that are rejected by high speed automated processing devices. For such documents it is advantageous to use the feeding and scanning features as discussed below. Similarly, a batch of pre-slit mail may be processed, whereby the operator manually opens the slit envelopes and then processes the documents as discussed further below. Accordingly, unless otherwise noted below, the following discussion of the document imaging process is applicable to a variety of applications in which a batch of documents needs to be imaged, without regard to how the documents are obtained (i.e. the documents are provided in a stack as opposed to documents that must be extracted from envelopes). Features of the present invention are not limited to applications in which the envelope opening and extraction features of the apparatus are used.

Drop Conveyor

Referring to FIGS. 1-8 and 15, the drop conveyor 100 is configured to receive documents extracted from the envelopes. The conveyor 100 is disposed along the front edge of the work station 10, such that the conveyor is operable to convey documents adjacent to and parallel to the front edge of the work station. In addition, the conveyor preferably conveys the dropped documents toward the left hand side of the workstation. More specifically, preferably the drop conveyor is located so it has a drop zone centered on the seating area, and aligned with the extraction station.

Preferably the conveyor 100 is configured to readily receive documents that the operator manually removes from an envelope at the extractor. More specifically, the conveyor is configured to receive documents that are simply dropped onto the conveyor and to convey the dropped documents to the imaging station 130. In this way, the operator can readily extract and, if necessary, unfold documents and simply drop a document or packet of documents onto the conveyor with minimal preprocessing of the documents to prepare the documents for scanning.

Although the operator preferably drops the documents onto the drop zone of the conveyor, the drop zone is a substantial area that is much larger than the documents. Accordingly, the operator does not need to be precise with the location and orientation that the document are dropped onto on the conveyor. However, preferably the operator drops the documents so that the documents are front face up on the conveyor. Nonetheless, since preferably both sides of the documents are scanned at the imaging station, if the documents are front face down, the apparatus can analyze the documents to determine which face is the front face.

To this end, preferably the conveyor 100 is a roller bed conveyor. The bed of rollers provides a generally horizontal surface onto which documents can be dropped. The roller bed comprises a plurality of horizontally disposed cylindrical rollers 102 driven by a belt 103 engaging the bottom of the rollers, which in turn is driven by a motor controlled by the system controller. The rollers 102 may be parallel to each other and perpendicular to the direction of travel so that the documents move straight along the roller bed 100. However, preferably, the rollers are skewed so that the rollers drive the documents forwardly along the roller bed and laterally toward a justification rail 105. In this way, the skewed rollers 102 drive the documents against the rail 105 to edge-align or justify an edge of the documents against the rail.

Each of the rollers 102 comprise a plurality of grooves sized to receive O-rings. The O-rings have a higher coefficient of friction than the surface of the rollers, to provide an area of increased friction between the roller bed and the documents, thereby improving the justification of the documents. As mentioned previously, the document rests on the rollers. Therefore, as the rollers 102 rotate, the rollers move the documents forwardly.

Figure 4:
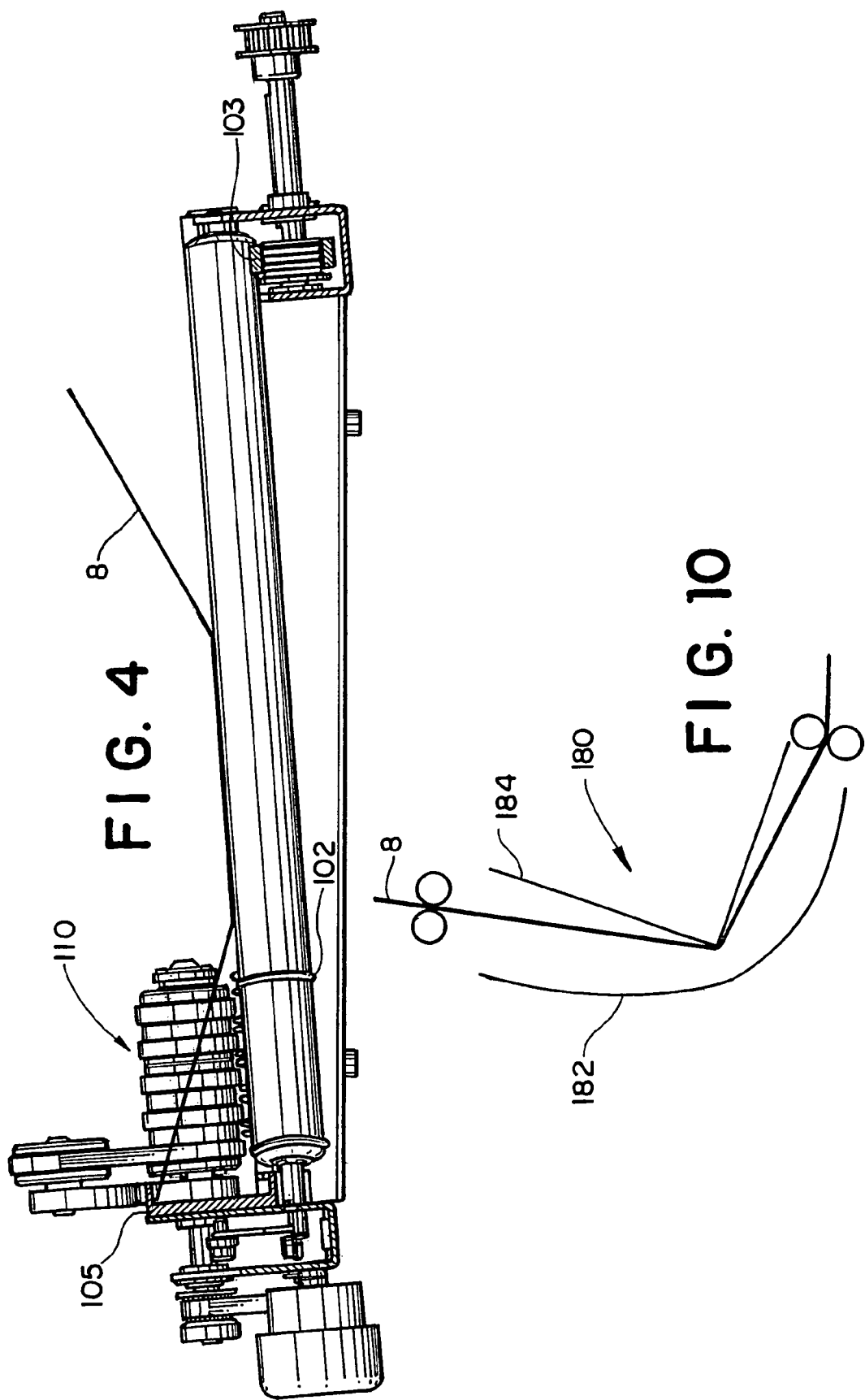
FIG. 4 is a fragmentary cross-sectional view of the drop feeder and imaging station sections illustrated in FIG. 3.

If a single document or a packet of folded documents is placed onto the conveyor, the creases in the documents may tend to make portions of the documents project upwardly or downwardly, which could cause problems feeding the documents as they enter the imaging station. Accordingly, preferably the justification rail 105 is configured as shown in FIG. 4. Specifically, preferably the rail 105 is formed of a low friction material, such as smooth aluminum or low friction plastic, and is formed into a generally U-shaped channel. In this way, the rail forms an upper lip 106 and a lower lip 107. The upper lip 106 prevents documents from sliding up and over the rail as the documents are displaced forwardly and toward the rail. The lower lip prevents documents from being forced downwardly between the rail and the edge of the rollers as the documents are displaced forwardly and toward the rail.

Although, the drop conveyor 100 has been described as a roller bed conveyor, alternative types of conveyors can be utilized as the drop conveyor. For instance, the drop conveyor may comprise a horizontal conveyor belt. If a conveyor belt is used, preferably the belt is skewed toward the rail 105 so that the belt justifies the documents against the rail. Alternatively, rather than a single conveyor belt, the drop conveyor may comprises a plurality of smaller conveyor belt onto which the documents may be dropped.

Another alternative drop conveyor comprises a plurality of wheels that project upwardly from a base. In such a configuration, the conveyor includes a sufficient number of conveyor wheels that are spaced apart from one another so that the tops of the wheels form a bearing surface to support the documents. In this way, the documents are dropped onto the wheels, and the wheels are arranged so that when the wheels turn, the wheels drive the documents forwardly. Additionally, preferably the wheels are angled toward the rail 105 so that the wheels justify the documents against the rail as the wheels drive the documents forwardly.

Although the conveyor 100 is referred to as a horizontal conveyor, preferably the drop conveyor is angled downwardly so that gravity urges the documents toward the guide rail 105. This can be seen most clearly in FIG. 4. Preferably the conveyor 100 is angled at approximately five degrees, however, the angle may be higher, and in fact, the angle of the conveyor may be increased to a point that the conveyor is vertical rather than horizontal. In addition, preferably the imaging station and sorting station are angled downwardly similarly to the drop conveyor.

Image Entry Feeder

Referring to FIGS. 1-8, 15 and 16, from the drop conveyor 100, the documents enter an image entry feeder 110 at the end of the conveyor. As the documents are conveyed to the imager, the documents are generally horizontally disposed, riding on top of the drop conveyor 100 and are edge-aligned against the justification rail 105.

On the conveyor, the documents are only held down by gravity, and the upper lip of the justification rail depending on how the document is creased. Since the documents may be creased, gravity is generally not sufficient to flatten down the documents so that the documents can be fed to the imaging station. Therefore, the image entry feeder 110 preferably provides at least two function: (1) positively engaging the documents to pull or push the documents downwardly; and (2) controlling the feeding of the documents to the imaging station.

Figure 7:
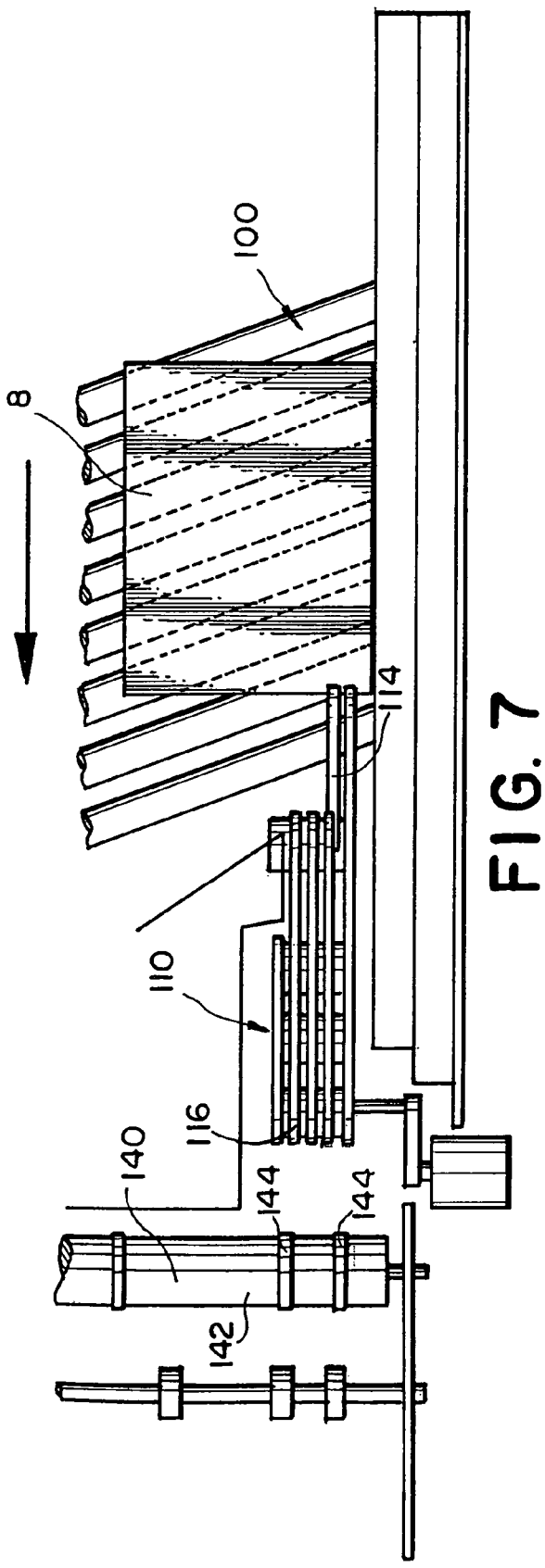
FIG. 7 is a schematic plan view of the drop feeder and imaging station sections illustrated in FIG. 3.
Figure 6:
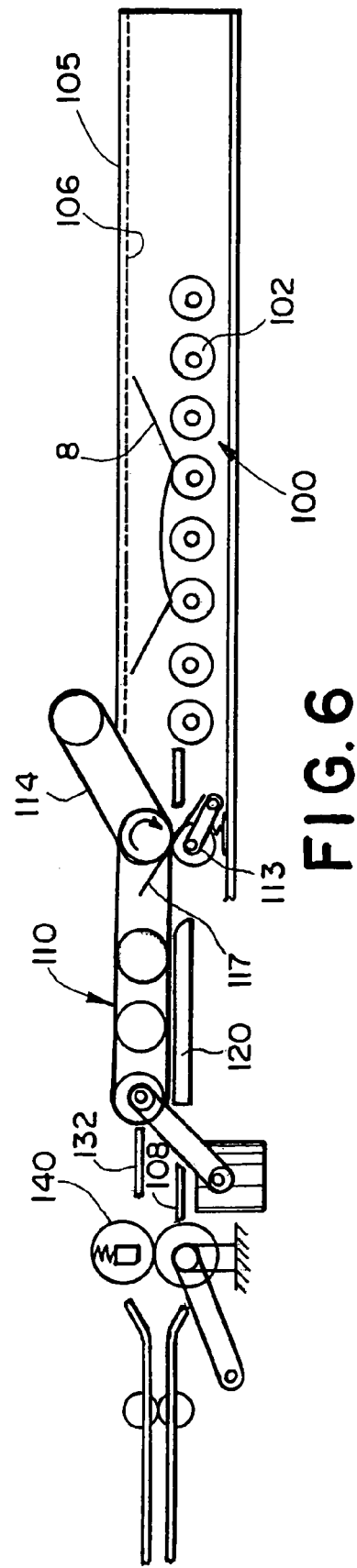
FIG. 6 is a schematic side view of the drop feeder and imaging station sections illustrated in FIG. 3.

As shown in FIG. 6-7, preferably, the entry feeder comprises one or more parallel feedbelts disposed substantially horizontal and parallel to the base plate of the feeder. Although the entry feeder 110 may comprise a single wide belt, preferably the entry feeder comprises a plurality of parallel belts that are progressively longer so that the documents are progressively nipped over a wider area as the documents enter the feeder, as further discussed below.

Preferably, the feeder belt comprises a first belt 112 that operates as the lead feed belt. The lead belt may be longer than the other belts in the feeder so that the lead belt projects outwardly toward the drop conveyor further than the remaining feeder belts. In addition, preferably, the lead belt is positioned adjacent the rail 105 so that the lead belt is closest to the rail.

An idler roller 113 below the base plate is biased upwardly into engagement with the end of the lead feeder belt 112 to form an entry nip. This nip is the initial nip that serves to control the documents as they enter the feeder 110. Since the nip is close to the rail 105, the initial control point is adjacent the rail, which is the justification edge for the documents. The lead belt 112 pulls the documents forwardly, so that the documents engage the secondary feed belts 116. At this point, the documents are engaged by both the lead belt and the secondary belts, so that the area of engagement with the documents, (and therefore control over the document) is wider.

In addition, preferably the entry feeder further comprises an arm 114 that projects forwardly and upwardly from the leading end of the lead feed belt 112, parallel to the lead belt. The forward arm 114 comprises a rotatable belt that forms an acute angle relative to the drop conveyor 100. The arm operates to push down any documents that may have portions sticking upwardly, as discussed below.

Figure 2:
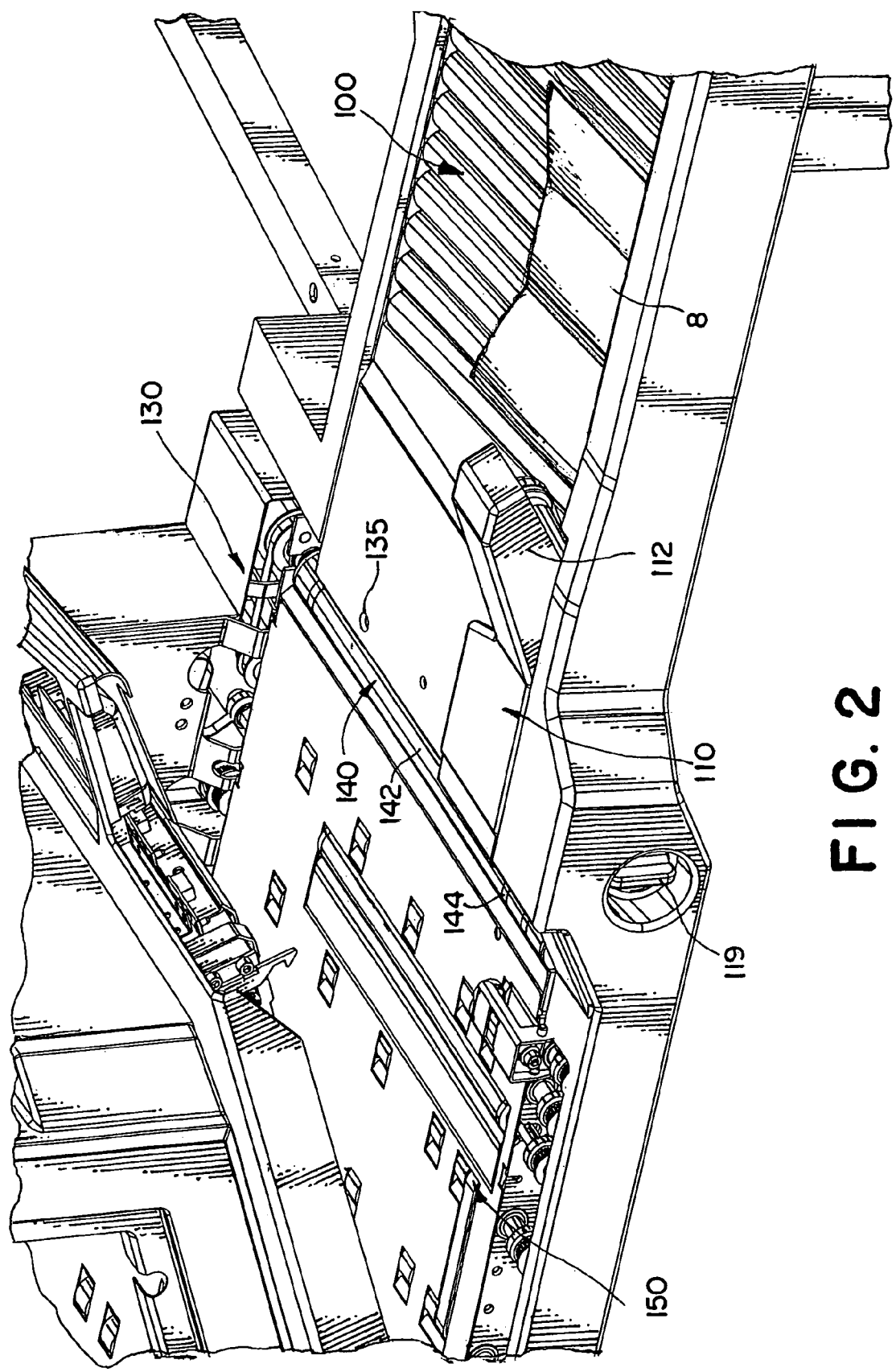
FIG. 2 is a fragmentary perspective view of a feeder section of the apparatus illustrated in FIG. 1.
Figure 3:
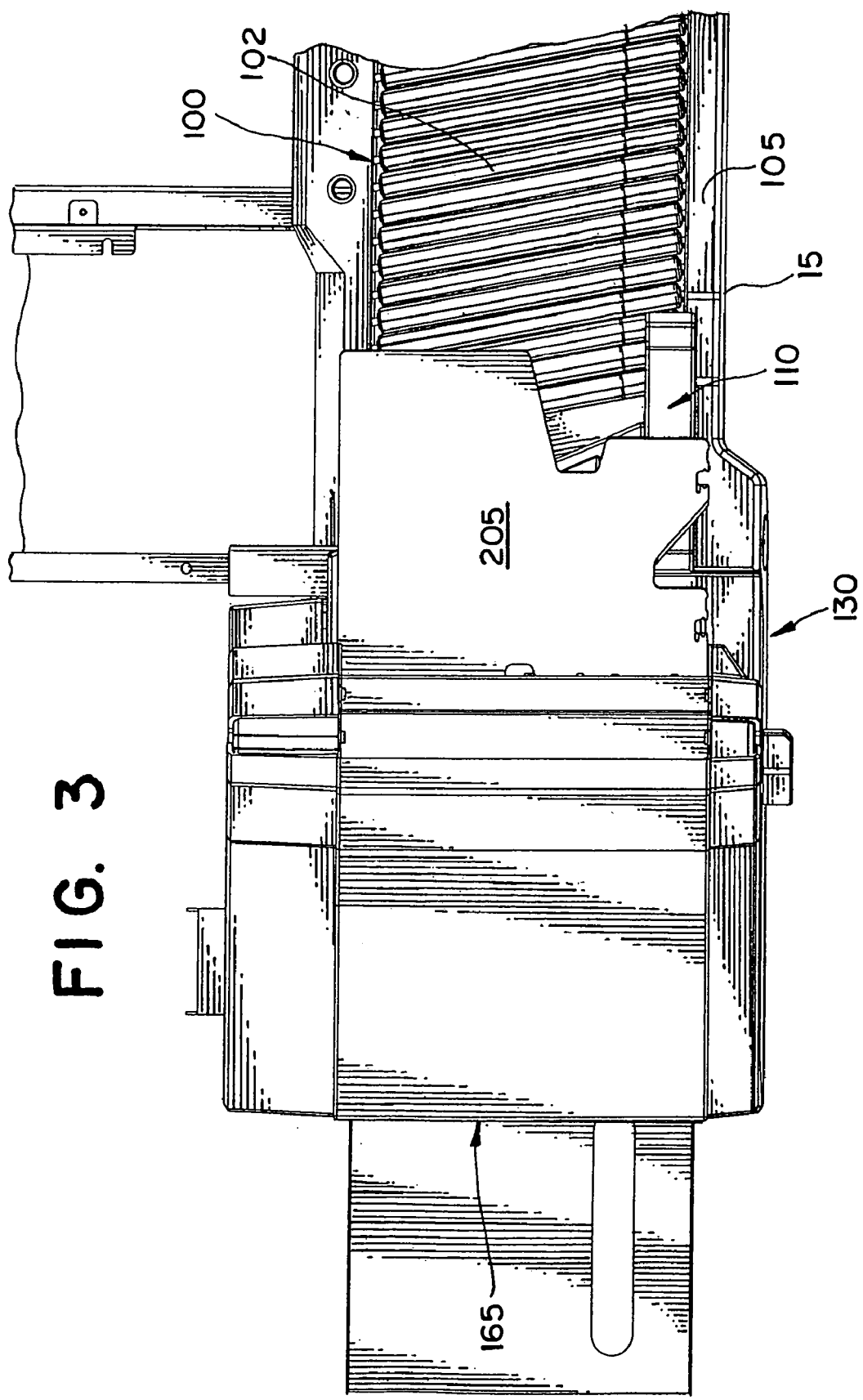
FIG. 3 is a fragmentary plan view of the drop feeder and imaging station sections of the apparatus illustrated in FIG. 1.

Referring to FIGS. 2, 6-7 a folded document is illustrated on the drop conveyor. The document is exemplary of a document that was folded into three sections (i.e. tri-folded) and placed in an envelope. When the document was extracted from the envelope and unfolded, the document retained creases that cause the leading and trailing edges of the document to bend upwardly (or downwardly if the documents are flipped over relative to FIG. 2, 6-7). Similarly, the document could be a tri-folded document in which the crease lines are parallel to the direction of flow of the conveyor, rather than perpendicular as shown in FIGS. 2,6-7.

A document having a leading edge that is creased so that the leading edge is folded upwardly will tend to fold over as it is fed into the feed nip between the lead feed belt 112 and the idler roller 113. If the document folds over, it will not image properly. The operator could flip the document over so that the leading edge is not folded up, which could limit the potential problems associated with folding the document. However, it is desirable to configure the entry feeder so that it can accommodate the documents regardless of the orientation of the documents and the folds in the documents.

Accordingly, preferably, the entry feeder 110 includes the angled feeder 114, which rotates clockwise from the perspective of FIG. 6. The angled feeder arm, or knock-down arm is a feed belt that operates to drive the documents downwardly if the documents are creased and sticking upwardly. The position of the angled feeder arm tends to push the folded portion of the document down to flatten the document without folding over the document. More specifically, the knockdown feeder projects forwardly and upwardly from the horizontal lead feed belt 112 so that the forward edge of the knock-down belt is disposed higher than the lead belt, and angled downwardly to where the knockdown arm 114 is about the same distance from the drop conveyor 100 as the lead feed belt 112. In this way, the leading edge of the knockdown feeder arm 114 extends upwardly above the height of most all folded documents, so that the feeder flattens the documents without folding the documents over. At the same time, the drop conveyor and the knock-down feeder arm 114 urge the documents toward the lead feed belt.

Once a document is nipped between the lead arm 112 and the idler roller 113, the feeder drives the document forwardly. The shorter feed belts 114 then engage the document, so that the document is nipped (i.e. controlled) over a wider portion of the document. Additionally, the portion of the document nipped by the feed belts 112, 114 is held down flat. In other words, as the document enters the feeder, the document is progressively flattened.

Figure 5:
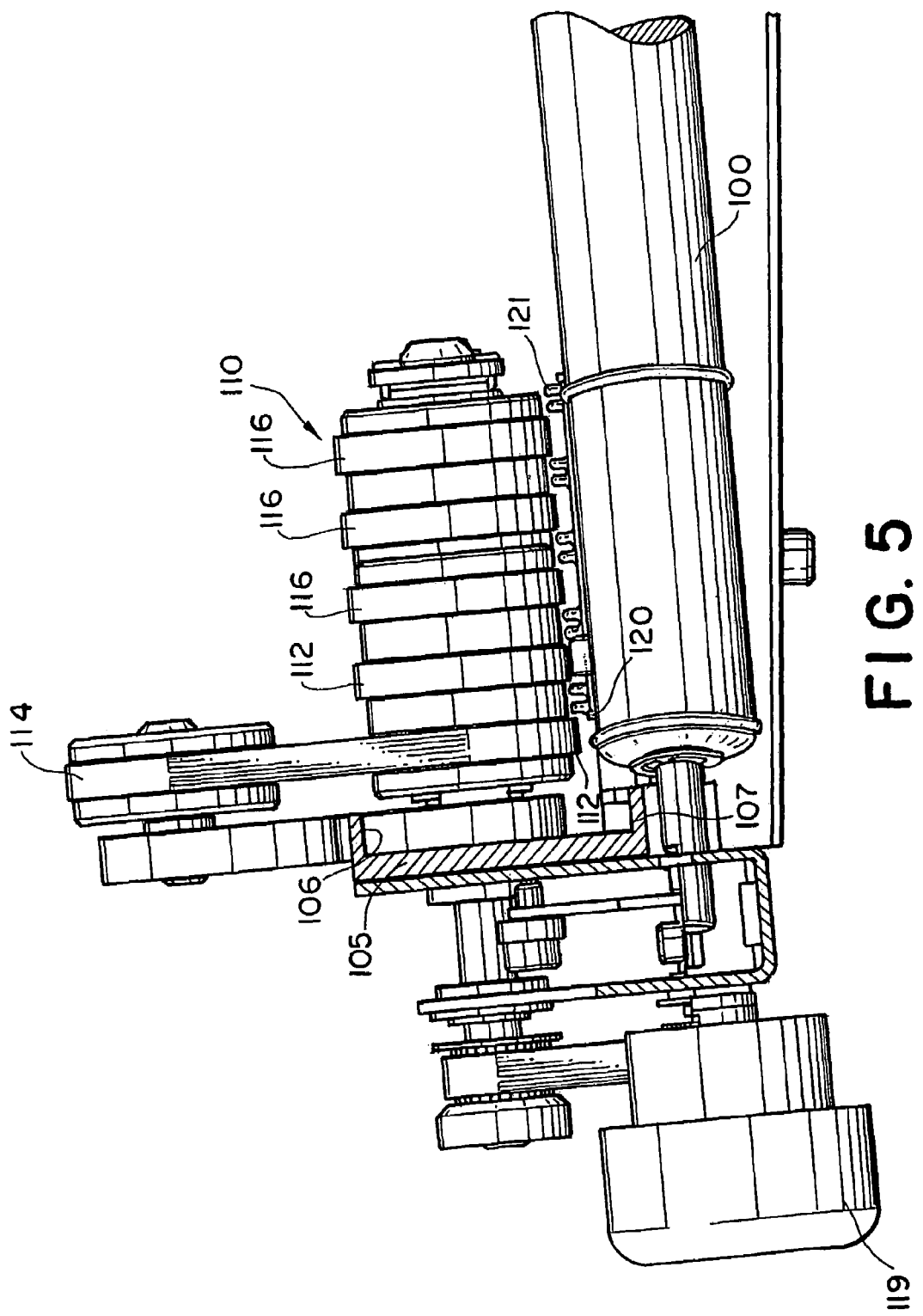
FIG. 5 is an enlarged fragmentary view of the drop feeder and imaging station sections illustrated in FIG. 4.

The nip formed under the short feed belts 114 is formed between the feed belts and a retard 120. The retard is formed of a high friction material so that the frictional force between a document and the retard is greater than the frictional force between two documents. The retard can be formed in any of a number of configurations. However, in the present instance, preferably the retard comprises a pad having a plurality of spaced apart ridges 121 that are disposed between the belts that form the feeder, as shown in FIG. 5. In this way, the documents engage the retard between the belts.

The entry feeder 110 operates to feed the documents to the imaging station through a feed slot that is formed between the base plate 108 and an entry guide 132. Preferably the entry guide 132 is spaced from the base plate approximately ¼". Since the documents are nipped by the feeder, the portion of the document at or adjacent the feeder will readily fit into the feed slot. However, the end of the document remote from the feeder may still stick up from creases or folds. For this reason, the leading edge of the guide is angled rearwardly (i.e. in the direction of the paper path, as shown in FIG. 7. In addition, preferably the leading edge of the entry guide is curved upwardly to provide a guide for forcing the leading edge of the document downward if the document has a portion sticking upwardly from folds or creases.

The foregoing discussion described the feeding of a single piece from the conveyor to the feed slot down stream from the feeder 110. However, the feeder is also operable to receive and separate packets of documents so that the documents are serially fed to the imaging station.

In order to accommodate packets of documents, preferably the lead feed belt 112 is spaced from base plate approximately ³⁄₁₆". When feeding the documents from the packet, the bottom-most document in the pack may tend to buckle in the gap between the feed belt 112 and the base plate. Specifically, the packet of documents is nipped between the retard 120 and the feeder 110, with the trailing end of the documents nipped between the lead belt 112 and the idler roller 113. When the second to last document is being fed through the feeder, the trailing edge of the second to last document is advanced out of the nip between the idler roller 113 and the lead belt 112 so that the last document in the stack is engaged by both the feed belt and the idler roller so that the nip drives the rearward edge of the last document forwardly. However, a portion of the second to last document is still nipped between the feeder and the retard, so that the last document is held back by the retard while the trailing end of the last document is driven forward, which can cause the last document to buckle between the baseplate and the bottom of the lead belt 112. Accordingly, preferably, an elongated thin flexible plastic 117 finger extends through the lead nip to support the document in the nip. Preferably the finger 117 is long enough to extend to the retard 120. By supporting the document, the finger prevents the document from buckling from the forward feed force when the retard is holding the piece back.

When a packet of two or more documents is received in the conveyor, the feeder is designed to control the documents so that they progress into the imaging station one at the time. If more than one document is fed at the time then one or more of the documents will not be imaged. The feeding of more than one document at the time is commonly referred to as a double feed.

A double feed is caused when two documents enter the imager together because the frictional force between the two documents tends to pull the second document along with the first document when the first document is fed to the imager. The retard 120 is provided to hold back the second document (as well as any other documents that may be in the packet), so that only the first document in the packet is fed to the imager.

Although it is typically desirable to utilize the retard so that packets of documents can be separated from one another, in certain instances it may be desirable to feed the documents without the retard. Accordingly, the device includes a pivotable retard control knob 119 that raises and lowers the retard. In a first position (which is shown in FIG. 5), the retard is raised so that the entry nip is formed between the feeder and the retard. By turning the control knob 119, the retard is lowered so that the top surface of the retard remains below the surface of the base of the imaging section so that the retard does not project up into contact with the documents. Instead, the entry nip is formed between the feeder and the base plate of the feeder.

Imaging Station

From the entry feeder, the documents serially enter a nip formed between a pair of crusher rollers 140. Although the entry feeder holds the documents down, it does not flatten the documents; it generally just holds an edge of the document flat against the base plate of the feeder. In contrast, the crusher attempts to flatten the creased documents.

The crusher rollers 140 are elongated cylindrical aluminum rollers 142 having a smooth surface. A plurality of elastomeric gripping rings 144 are formed around the circumference of the roller 142, and spaced apart from one another. Preferably, a first gripping ring is positioned at the end of the roller 144 closest to the entry feeder 110, and a second gripping ring is positioned on the roller a couple inches away. More specifically, preferably the second gripping ring is spaced inwardly less than the width of the feeder 110. In addition, preferably a third gripping ring is positioned adjacent the opposite end of the roller. The first and second gripping rings 144 provide nips that drive the paper from the entry feeder to the imager 150. The third gripping rings are positioned so that they are not in the paper path (i.e. the third gripping rings do not engage the documents. Instead, the third gripping rings provide spacing to maintain the rollers parallel with a constant gap.

Preferably, the first two gripping rings 144 on the rollers 142 are positioned so that-both rollers engage a single fold for documents that are tri-folded with the fold lines disposed parallel to the paper path (i.e. the fold line would be perpendicular to the fold line on the document 8 in FIG. 2). In this way, the gripping rings engage the edge-justified third of the tri-folded document, while the rest of the document can slide across the width of the crusher roller since the remaining width of the crusher roller in the paper path is aluminum. In this way, the crusher roller flattens the documents without buckling the documents.

As the documents are processed through the imaging station 130 and through the imaging transport 170 and the sorting station 200, the documents should be properly spaced apart to prevent jammings to ensure a properly scanned image of each document, and to allow proper gating of the documents during subsequent processing. If the operator separates each document in a transaction and drops the documents serially onto the drop conveyor, the operator has provided the gap between the documents. However, if the operator drops a packet of documents onto the conveyor, the documents need to be separated in a way that provides proper gaps.

The gaps can be provided in one of at least two manners. First, the imaging entry feeder 110 can control the feeding of the documents to provide gaps. For instance, after the feeder 110 feeds the first document from the packet, the feeder may stop or slow down for a pre-determined time period before feeding the next document in the packet. This delay will create a gap between the documents. Alternatively, the gaps may be provided by running the feeder 110 at a slower speed then the transport path through the imaging station. This difference in speed will create a gap between the documents.

As can be seen in FIG. 2, a plurality of skew sensors 135 are disposed in the feeder between the entry feeder 110 and the crusher roller 140. The skew sensors detect the leading edge of each document to determine whether the document is skewed relative to the crusher roller (which is parallel to the imager). The skew sensors 135 are preferably a plurality of optical sensors aligned with one another along a line that is parallel with the imager 150. Further, preferably, the first sensor is positioned adjacent the front edge of the work station, and preferably the second skew sensor is spaced apart from the first skew sensor a short distance so that the skew sensors can detect the skew of relatively narrow documents. Further, a third sensor is aligned with the first two sensors and spaced further away (i.e. preferably at least 3-6 inches) away from the second sensor. The central controller receives signals from the skew sensors. If the documents are slightly skewed, the documents may continue through for further processing. However, if the document is overly skewed, the central controller electronically tags the document for rejection so that the document is transported to a rejection bin without being imaged. Alternatively, if the document is extremely skewed, it may not pass through the imaging station and/or sorting station without jamming. Accordingly, the central controller stops the operation of the apparatus and provides an indicator (such as a warning light or a notice on the control screen) that the document needs to be removed from the imaging station.

After passing the skew sensors 135 and the crusher roller 140, the document passes through a thickness detector 147 that measures the document at a plurality of points along the length of the document. The thickness detector may be any of a variety of sensors, such as an LVDT sensor. However, preferably the thickness sensor is a Hall effect sensor.

The Hall effect sensor 147 includes a sensor board disposed adjacent a magnet that is mounted on a linkage that biases the magnet toward the sensor. The magnetic field created by the magnet is measured by the sensor board as a function of the distance between the magnet and sensor. The magnet and sensor are linked to a pair of rollers between which documents are pinched when the document enter the thickness detector 147. When an envelope enters the thickness detector 147, the arms are forced apart, thereby separating the magnet and the sensor board accordingly, changing the magnetic field intensity. The thickness data is communicated with the system computer and is stored in a data file associated with the document.

Figure 8:
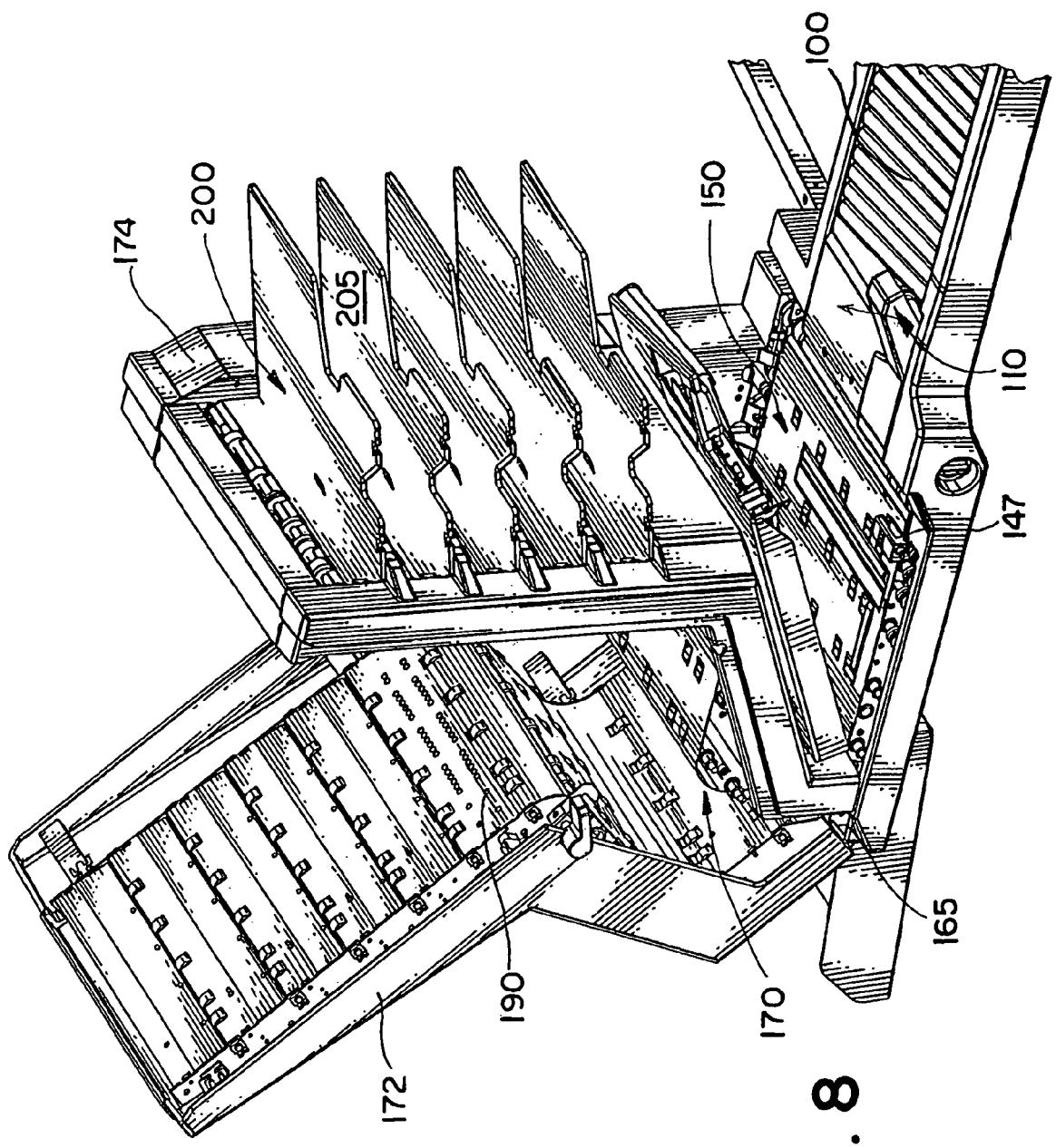
FIG. 8 is a fragmentary perspective of the drop feeder and imaging station sections illustrated in FIG. 3, illustrating the imaging section in an opened configuration.

From the thickness detector 147, the document enters the imager 150. Preferably the imager comprises a pair of scanners for scanning both sides of the document. Specifically, preferably the imager 150 includes a lower plate in which the lower scanner 150 is located, and an upper plate in which the upper scanner is located. The lower scanner 150 scans the bottom face of the document, and the upper scanner scans the upper face of the document. As shown in FIG. 8 preferably the upper plate is pivotable upwardly away from the lower plate to allow access into the imaging station 130 in the event of a jam in the imaging station.

Although the scanners may be black and white or gray scale, preferably, the scanners 150 are color scanners. More specifically, preferably the scanners 150 are contact image sensor (CIS) modules formed of arrays of photodiodes that operate as scanning elements, and LED light sources.

The scanner 150 scan the documents in three light colors, preferably red, green and blue. The scanner scans the documents and acquires data representing the light intensity for each of the three colors at discrete points of each document. For each color, the light intensity of each point, or pixel, is represented by a number ranging from zero to 255. The light intensity for each pixel is communicated to the computer and is stored in a data file. In addition, rather than being scanned in color, the documents can be scanned in gray scale.

As the document passes between the scanners, the scanners scan the faces of the document to obtain image data representing a color image of the document faces. The image is communicated with the system computer and the image data is stored in a data file associated with the document.

From the scanner, the document is conveyed to a MICR detector, which attempts to read any MICR markings on the document. Specifically, MICR markings are printed in magnetizable ink. The MICR detector includes a magnet that exposes the document to a magnetic field. The MICR detector also includes a MICR reader that scans the document for magnetic fluctuations indicative of MICR characters. If the apparatus detects the presence of a MICR line, the MICR detector attempts to read the MICR line. The data representing the MICR information is then communicated with the system computer, which stores the MICR data in a data file associated with the document.

Acquisition and Processing of Image Data

When the image entry sensor detects the presence of a document, the image entry sensor sends a signal to the system controller indicating the presence of a document. The system controller then sends a signal to the scanners regarding the document and data about how the document is to be processed. For instance, the system controller sends a signal to the scanning station indicating what type of document is being scanned and whether the default scanning parameters are to be modified for the document (e.g. the document is to be scanned on a darker setting).

The scanners scan the document to acquire image data. The system computer receives the image data from the scanners and then stores the data in memory. Once the image data is transferred to the system computer, the image data is processed. Although the scanner preferably scans the documents in color, preferably the image data is processed to provide a gray scale image that can also be binarized, as discussed further below.

First, preferably the gray scale data is binarized to create a black and white representation of the document image. By binarizing the data, the data for each pixel is converted from an eight bit gray scale representation to a one bit black or white representation, which significantly reduces the space that is required to store the image data. In addition, binarizing the image data operates to highlight the textual portions of the image, which is advantageous for further processing of the image data.

To binarize an image, the gray scale data for each pixel of the image is compared with a threshold. If the gray scale number for a pixel is above the threshold, the gray scale is converted to white. Conversely, if the gray scale number is below the threshold, the gray scale is converted to black.

To account for variations among the different documents being processed, an adaptive threshold may be used so that the binarization threshold is variable for each document. An adaptive threshold uses a different threshold for each particular document based upon a sampling of the image data for the particular document. By using a threshold that is specific to each particular document, the threshold for a document that has a generally dark image will typically be different than the threshold for a document having a generally light image. In this way, the resulting binarized image will more closely reflect the image of the document than if a set threshold is used for all of the documents.

In addition to binarizing the image data, the image data is filtered to reduce noise, which eliminates unnecessary background and stray marks from the document image. The noise filtering can be performed either in series or in parallel with the binarization. To filter the data, the imaging computer examines the image data to detect any black pixel that is surrounded by white pixels. If a black pixel is surrounded by white pixels, the imaging computer converts the pixel from black to white. Similarly, if a pair of adjoining black pixels are surrounded by white pixels, both pixels are converted from black to white.

After the image data is binarized and filtered, the imaging computer attempts to read information from the document. For instance, the imaging computer may attempt to read an OCR line if the document is an invoice or the MICR line from if the document is a check. The OCR line data is helpful for later processing because the OCR line for documents, such as invoices, includes information about the customer's account and the amount of the invoice. During subsequent processing, it is helpful to know the customer account number. In addition, it is helpful to have other information about the document to process the document. For instance, it is helpful to know the invoice amount.

Based on data received from the system controller, the imaging computer knows what type of document is being scanned. Specifically, as discussed further below, the document type may be automatically determined for each document based on information that is acquired for the document during processing (e.g. document length and thickness). In addition, as discussed further below, the operator may manually identify the document type by selecting the appropriate document type when the document is dropped onto the conveyor. If the image represents a payment stub, the imaging computer processes the image data for the document in order to determine the document's OCR line, which typically appears at the bottom of payment stubs. The OCR line is a series of characters printed in a uniform predefined typeface of predefined size. Commonly, the typeface is a type referred to as OCR A, however, other types of typeface can be read, such as OCR B, E13B and others.

In addition, the imaging computer can function to process the image data to read the MICR line of checks so that the MICR line is read both optically and magnetically by the MICR character reader. As previously described, the MICR character reader magnetically reads the MICR line on checks. However, the MICR character reader may be unable to read one or more characters in a MICR line because of imperfections in the magnetic characteristics of the MICR line ink. These magnetic imperfections, however, may not affect the imaging computer's ability to read the MICR line from the optical image data, so that a character that cannot be read magnetically may be readable optically. Therefore, if the MICR character reader is unable to read a character in a MICR line, the data obtained optically is used to supplement the data obtained from the MICR character reader in an attempt to complete the MICR line data.

Alternatively, it may be desirable to use the imaging computer to verify the results from the MICR character reader. By verifying the results, the possibility of checks being processed with improper MICR data is reduced. For this purpose, the MICR line data obtained optically can be compared with the MICR line data from the MICR character reader. If there is any mismatch between the optically read MICR line and the results from the MICR character reader the imaging computer indicates that the MICR line was not determined. The system controller then tags the document as having an undetermined MICR line and the document along with the remaining documents in the same transaction are directed to a reject bin or sorted by the stacker accordingly.

After the OCR line or MICR line data for a document is extracted from the image data, the image data for the document is compressed using a compression algorithm, such as Group 4 fax compression commonly referred to as "CCITT Group 4." The compressed image is combined with other data for the document. For instance, the document type may be combined with the data representing either the MICR line or the OCR line, along with data from the system controller to form a data record for the document. The data from the system controller includes information from the envelope from which the particular document was extracted, such as a change of address indication, the presence of a postnet barcode, and the presence of a mark indicating a customer response. The data from the system controller may also include an indication of whether the MICR line and OCR line were completely determined during imaging. Accordingly, the data record for a document includes the image data (the color image data, the gray scale image data and/or the binarized data), the MICR or OCR line, an indication of whether the OCR or MICR line is complete, a barcode, and miscellaneous information obtained during the processing of the document, such as the length and/or thickness profile of the document, as well as customer response data in the form of a change of address, or a check mark in a response mark.

Alternatively, it is frequently desirable to store the color or gray scale images of the documents in the data records rather than the binarized and filtered images. To store the color or gray scale images, a copy of the color or gray scale image data for each document is binarized and filtered as described above so that the image computer can determine the MICR or OCR line, and other information from the image data. The color image data is then compressed using data compression, such as JPEG, and the image data is combined with other information to create a data record as previously described for the binarized and filtered images. The binarized and filtered image can then be discarded from the imaging computer's RAM.

In addition to the previously described functions, the apparatus is operable to modify the image in any of several ways. For instance, the image can be de-skewed, and the black border that frequently occurs around the scanned image can be removed during processing of the image. The image can also be rotated to correct the orientation of the image. More specifically, a document may be fed into the imaging station in an improper orientation, so that the orientation of the image does not reflect the correct orientation of the image. For instance, a document may be printed in what is commonly referred to as a landscape orientation, in which each line of printing extends across the long side of the page (i.e. the length), rather than across the short side of the page (i.e. the width). If the short side of the page is fed into the imaging station, the image may be displayed in a normal upright portrait orientation, commonly referred to as a portrait orientation. In such an instance, the printing on the image would appear to be rotated (e.g. rather than reading from left to right, the printing would read from top to bottom). By rotating the image 90° the image would appear correctly.

Whether an image needs to be rotated can be determined in one of several ways. For instance, the operator may intervene and input information indicating that the image needs to be rotated, and how much. Alternatively, the imaging station can automatically determine whether the image should be rotated. In one application, the imaging station can determine the correct image orientation based on the document type. As discussed further below, the document type can be determined automatically based on various characteristics of the document (e.g. length, width, thickness profile, magnetic character position). Based on the document type, the imaging station can automatically rotate the image as necessary. For instance, checks are printed in a landscape orientation. By determining the length, width and location of MICR characters on the document, the device may automatically determine that a document is a check. Since the document is a check, the imaging station may rotate the image data as necessary so that the image data appears in a landscape orientation.

As described above, the document type is determined automatically based on characteristics of the document. However, as described further below, the document type can be determined manually or semi-automatically. Regardless of how the document type is determined, the image data may be automatically rotated to correspond to the proper orientation for the document type. Further still, rather than being automatic, the image rotation may be semi-automatic based on the document type. For instance, based on the document type, the system may determine that a document should be rotated, but the operator may be prompted to confirm whether the document should be rotated. Depending on the response (or possibly the lack of a response) the image data may or may not be rotated.

As described above, the image is rotated based on document type. In certain instances, it may be desirable to prevent the image from being rotated based on the document type. Specifically, the system may be configured so that images of documents of a certain type are rotated, as necessary, based on an assumed configuration for the document type. If the operator recognizes that the image of a document should be oriented in a specific way, the operator may override the system to scan the document in a certain configuration. For example, if a document of type "A" is assumed to be landscape orientation, the system will automatically rotate the image to be viewed in a landscape orientation. However, if the operator recognizes that a document of type "A" is actually in portrait orientation, the operator may press a button overriding the rotation. In other words, the operator can manually force the system to recognize the document in a certain orientation, and rotate the document or refrain from rotating the document as appropriate.

The image data can also be electronically stamped to identify audit trail information, such as the batch number, piece number, document-type and/or the date the document was processed. To electronically tag the document images, the image data is modified so that the audit trail information is "printed" on the image file for the document. In this way, the image data will show audit trail information as if the information was printed on the document before the document was imaged.

The audit trail information may be stamped onto the document image in one of several ways. For instance, the information may be stamped onto each document in a predefined area. Alternatively, a border may be added around the image data and the information may be electronically stamped in the border to ensure that the stamped information does not overlap and thereby alter the image data. In yet another alternative, the audit trail information is stamped onto the document so that each pixel that makes up the audit trail info is the exact opposite of the actual image data for the pixels where the information is being stamped. For instance, if the image is a binary image, and the information is to be printed in an area that has both black and white pixels, every pixel of the audit trail that is to be stamped onto an area that is black will be stamped as white, while the pixels that are white will be stamped as black. Although the above discussion of printing the audit trail information describes situations in which the image is binarized, the apparatus is also operable to stamp portions of the document image that are color or gray scale. Specifically, the electronically stamping is performed so each pixel comprising the electronic stamping is the gray scale or color number that best corresponds to the opposite light intensity of the pixels that make up the area that is to be stamped over.

Preferably, the documents are sorted and maintained in groups referred to as batches, which are identified by a unique batch number. The image data for a batch of documents is organized and maintained into batch data record files referred to as batch files. The batch files are organized so that the organization of the images in a particular batch file directly corresponds to the organization of the documents in the batch.

A complete batch file includes a batch header and the data records for each of the documents in the corresponding batch. The batch header includes information that is common to all of the documents in the batch, such as the batch number, the date the documents were processed, and the number of documents in the batch. Once all of the records have been appended to a batch file, the batch file can be exported to an image file server in the form of a personal computer, PC, via an ethernet connection.

Difficulties may arise when imaging the documents. For example, the MICR module 220 and the imaging computer may not be able to read the MICR line for a check or the OCR line for a payment stub. If such a problem arises, the image, along with the data that was ascertained from the image may be exported to the respective batch file for the document and the document may be sorted with the other documents in the batch. In this way, the document and the image data for the document are available for subsequent processing, at which time the missing information can be manually read and entered into the data record for the document. Alternatively, the display may prompt the operator to examine the scanned image displayed on the screen and enter the missing information. Alternatively, if some information, such as the MICR line or OCR line is not fully read for a document, the document along with the other documents in the same transaction may be directed to a reject bin. If documents are directed to a reject bin, then the image computer discards the image data for the documents in the transaction.

Although the description has focused on the processing of checks and invoices, the apparatus is not limited to imaging checks and documents. More specifically, the apparatus is operable to scan and process a variety of documents that may include a variety of information that may be scanned and analyzed. For instance, the imaging station is configured to accommodate documents at least as large as 8½×14. In addition, the image data exported to the data file may include more data than just the image file for the entire document. For instance, portions of the documents can also be included in the data file. For instance, for a check, an enlarged view of the courtesy box on a check can be included in the data file. Further, the portion of an image in which a bar code is located can be separated out as a file and included in the data file. The portions of the scanned images that are attached to the data file is not limited to a single portion. Preferably, up to ten different image data sets can be included in the image data file. In this way, a variety of image portions can be stored in the data file together with the image data for the entire image, if desired. Additionally, a variety of information can be stored in the data file with the image data, such as the length and/or height of the document, the thickness profile, the MICR line etc.

In addition, in certain instances it may be desirable to feed a batch ticket before the batch of documents are fed. The batch ticket includes a variety of information specific to the batch of document. For instance, the batch ticket may identify the batch number and the date that the images were processed.

Imaging Transport

As shown in FIG. 8, the imaging transport 170 extends between the imaging station 130 and the sorting station 200. Preferably the imaging transport is formed of two halves, and the upper half 172 is pivotable away from the lower half 174 to provide access to the transport path to remove any paper jam in the transport, or perform service on the interior element.

As shown in FIG. 8, the document path between the imaging station 130 and the sorting station 200 is preferably not a straight horizontal path. Instead, preferably, the imaging transport 170 turns upwardly and curves backwardly toward the seating area 15. Specifically, the imaging transport 170 conveys the document away from the scanners 150 in a generally horizontal direction parallel to the base plate of the lower scanner plate. The transport 170 then curves upwardly, thereby turning the document upwardly along a generally vertical path. The transport 170 then curves back generally horizontally toward the seating area. In other words, the transport essentially provides a U-turn, turning from the imaging station back toward the operator. The reverse leg of the U-turn also extends somewhat upwardly at an angle relative to the scanner base plate. At the end of the reverse leg of the U-turn, the transport 170 curves back upwardly, thereby turning the document upwardly along a generally vertical path to the sorting station 200.

Between the imaging station 130 and the sorting station 200, preferably an optional uncreasing station and a printer are disposed along the transport path.

Referring to FIG. 10, a schematic view of the uncreaser 180 is illustrated. As discussed previously, it is desirable to remove the creases from folded documents so that the documents can be more efficiently stacked in the output bins 205. The uncreasing station 180 is a guide having a sharp edge that the documents pass over as the documents turn around the U-turn.

More specifically, the transport path includes a pair of guides that direct the documents upwardly. The guide on the outside is a generally smoothly curved guide 182. The guide 184 on the inside of the turn includes an edge. For example, comparing the outside guide to the inside guide, the outside guide is a smoothly curved metal track, whereas the inside track includes two generally flat or straight legs formed at an angle to one another. The intersection of the two straight tracks forms an edge that operates as a sharp edge.

Preferably the documents are pulled tightly against the sharp edge as the documents are conveyed across the sharp edge. To do so, preferably the documents are tensioned by increasing the transport speed on the downstream side of the sharp edge. Specifically, a nip is formed downstream from the sharp edge, and the transport speed from the nip forward is higher than the transport speed upstream from the uncreaser. In this way, when the document enters the nip, the higher speed of the transport pulls on the document, which tensions the document as it is pulled over the sharp edge. Pulling the documents over the sharp edge removes or reduces the creases in the documents.

Although the uncreasing device has been described as a guide having a sharp edge, various other types of uncreasing elements can be employed. For instance, the sharp edge can be mounted on a solenoid adjacent the document path through the transport 170. The solenoid can be controlled so that it displaces the sharp edge into the paper path so that the paper is pulled over the sharp edge when the solenoid is actuated. The solenoid can then be de-energized to retract the sharp edge out of the paper path on selected documents or on selected portions of documents (i.e. if only the second half of a document needed to be uncreased, the solenoid could be timed to be actuated to displace the sharp edge into the path when the second half of the document passed by). Yet another alternative uncreaser is a heater. The heater includes a pair of rollers forming a nip that the documents pass through. One of the rollers is heated to an elevated temperature sufficient to reduce creases in the documents.

Additionally, the apparatus may include a second uncreaser to uncrease the opposite side of the document. Specifically, the second uncreaser may be configured similarly to the first uncreaser except that the second uncreaser may be formed by the outside guide, rather than the inside guide as described above.

Although the uncreaser has been described as being located between the MICR reader and the printer, it may be desirable to locate the uncreaser in a different location. For example, the uncreaser may be located prior to either the scanners 150 or before the MICR reader. Further still, the uncreaser may be located downstream from the printer if desired.

In addition, preferably a printer is disposed along the transport 170 so that the printer can print markings on the documents as they are conveyed to the sorting station 200.

After the documents are imaged, the transport conveys the documents to a printer module 190 which is controlled by the imaging computer. The printer module 190 includes at least one ink jet printer. The printers 190 are disposed behind covers in the imaging transport. More specifically, a first printer is preferably disposed behind a plate in the upper portion 172 and preferably the second printer is disposed behind a plate in the lower portion 174. In response to signals from the computer, the printer module 190 prints audit trail data onto each document. The audit trail information printed on a document includes data particular to the document, such as the document type for each document, the batch number for the document, the document number, the transaction number for the transaction of which the document is a member, and the date on which the document was processed. The audit trail information can be used to subsequently locate a particular document within a stack of documents. Generally, it is desirable to only print information on the back face of each document. However, the printer module may also include a second ink jet printer to print additional information on the front face of the documents. If a second printer is used, the imaging computer controls the printers to selectively print on either or both sides of a document.

Sorting Station

The sorting station 200 is disposed at the end of the imaging transport 170, and the sorting station includes a plurality of gates 204 operable to sort the documents into one of a plurality of bins 205. Preferably, the documents are processed so that the documents are discharged into the bins 205 face down, so that the stack of documents in the output bins is in the proper order so that the stack does not need to be re-ordered after the documents are processed.

As shown in FIG. 8, the sorting station includes a plurality of gates that are operable to direct the documents to the appropriate bin 205. The sorting can be based on a number of criteria. For instance, the documents can be sorted according to information determined from the image data. One such example relates to forms that have a change of address check box (i.e. the consumer checks the box if the consumer's address changes). The image data can be analyzed to determine whether a change of address is indicated. If so, the sorter 200 can sort such documents to a particular bin 205 to keep such documents together. Similarly, the documents can be sorted based on other criteria, such as the thickness profile of the document, which can indicate what type of document the document is, or the documents can be sorted based on the length of the documents, which can be measured by one of the sensors at the entrance to the imaging station. In addition, the documents can be sorted based on a combination of the information that is determined for a document (i.e. thickness profile, length, MICR reading, OCR reading, barcode reading or an identifying mark). Further, documents that are electronically tagged for outsorting or rejection can be sorted to a particular bin.

In addition to identifying the pieces automatically, the operator may manually identify the document type before the document is scanned. The piece is then sorted based on the indicated document type. For instance, there are five bins in the sorting station, and there may be five or more different document types defined for a particular batch of documents. Each type of document is sorted to a different one of the bins 205, unless there are more document types than bins, in which instance, more than one document type will be sorted to some or all of the bins. Each document type is represented by a different button on the touch screen 12. When the operator places a document onto the conveyor 100, the operator presses the button that identifies the document type, and the document is sorted accordingly. Alternatively, when the operator pushes the button to identify the document type, the apparatus may assume that all subsequent documents are the same type of document until the operator presses a different button. In this way, the operator need not manually identify each document if a batch of documents contains groups of the same type of document.

Further still, the manual indication described above can be combined with the automatic determination described above. Specifically, the apparatus may automatically identify the document type unless the operator manually overrides the system by identifying the document type for a document when it is placed onto the conveyor.

In the discussion above, the documents were sorted according to various sort criteria based on information about each document. However, in some applications it may be desirable to simply sort the documents in the order in which the documents are processed. In such an application the documents are sorted to the first bin 205 until the bin is full. The documents are then directed to the second bin until it is full, and/or until either all of the bins are full or all of the documents are processed. This process of switching from one bin to the next when the bin is full is commonly referred to as waterfalling, and the bins are operable to waterfall in various sorting applications.

As discussed previously, the documents may have creases that frequently affect the processing of the documents. At the sorting station 200, the creases can affect the stacking of the documents in the bins. Specfically, if the documents are creased along lines perpendicular to the document path, the documents will tends to fold underneath themselves as they are discharged into the output bins 205. Accordingly, preferably the sorting station includes corrugation rollers to corrugate the documents so that the documents are rigid enough to discharge properly so that the documents stack properly in the bins.

Preferably, the corrugation rollers are configured as follows. The rollers are positioned on two parallel shafts, with one of the shafts being biased toward the other shaft. Opposing discharge rollers are located on the outer ends of the shafts. The discharge rollers provide discharge nips that the documents pass through. Intermediate the discharge roller are three corrugation rollers that are larger than the discharge rollers, preferably by at least approximately 25%. Two of the corrugation rollers are positioned on the first shaft, with the third roller being positioned on the second shaft at an axial location between the two corrugation rollers on the first shaft. In this way, the three corrugation roller project into the paper path creating a deep corrugation that provides sufficient rigidity to properly discharge and efficiently stack the documents.

Bypass

As discussed above, the documents leaving the scanners 152 are conveyed along the imaging transport, which extends upwardly to the output bins. Alternatively the sorting bins can be bypassed by directing the documents through a bypass that has an opening across from the imaging station and under the imaging transport 170. The documents can be conveyed horizontally from the imaging station 130 and discharged to an output bin or area 166 on the backside on the imaging station (see FIG. 3). The bypass can be used in several applications to improve the flexibility of the apparatus.

For instance, if a batch of documents simply needs to be imaged without sorting the documents after processing, then the sorting station is unnecessary. The documents can be dropped onto the conveyor 100 and then fed to the imaging station 130. From the imaging station the documents are conveyed straight back and discharged though the bypass 165 into the output area 166. In this way the scanned documents are simply stacked in a single stack in the output area.

The bypass also allows for thick documents to be scanned. Specifically, documents that are thicker than twice the thickness of paper may tend to jam in the imager transport after the documents are imaged. However, the documents will not typically jam if they are discharged out the bypass. Accordingly, thick documents can either be processed together so that all of the documents in the batch are scanned and then directed out the bypass 165, or optionally, the thick documents can be a defined document type that can be analyzed automatically based on the output from the thickness detector 147. If the thickness detector 147 detects a document that is greater than a predetermined limit, the document is directed to the bypass 165. Alternatively, the operator may be able to identify the document as a thick document when the document is dropped onto the conveyor 100. The document is then directed to the bypass 165 after being imaged. (There is also a maximum thickness for thick documents. If the thickness is greater than the maximum thickness, the document is too thick to process, even through the bypass).

Yet another use of the bypass 165 relates to disposing of envelopes. As discussed further below, opened envelopes may serve as an indicator of the beginning or end of a transaction. Typically, it is not necessary to retain the document and it would be a waste of space in the sort bins 205 to fill them with the envelopes.

Accordingly, when using opened envelopes as transactional markers, preferably the envelopes are discarded through the bypass 165, while the documents are scanned and then sorted into the sorting bins 205. The envelope can be identified as an envelope in one of several ways. First, the operator can manually identify the envelope as an envelope. Second, and more preferably, the a pparatus identifies the envelope as an envelope based on the thickness profile detected by the thickness sensor 147. If the thickness profile for a document correlates to an envelope, then the apparatus assumes that the item is an envelope and the envelope is directed to the bypass and discharged to the discharge area. For this reason, when processing envelopes with the documents, preferably a waste container is provided at the discharge area so that the envelopes can be conveyed directly into the trash.

In the previous discussion, it is assumed that it is not desired to keep the envelope after processing. In many instances, since the envelope is merely a transaction marker, there is no need to retain the image of the envelopes, so that the envelope images are also discarded. However, in certain instances it may be desirable to retain the envelope image even though the actual envelope is discarded.

In yet another application, the bypass 165 is used to accommodate envelopes that have contents inside. The function of this application is similar to the processing of thick documents described above. In such an application the envelopes are scanned to obtain an image of the front and rear faces of the envelope. The envelope is then discharged out the bypass 165, where the envelopes are stacked.

In still another application, the bypass is used to accommodate stacks of documents that are processed together so that only the top document is scanned. The stack of envelopes is then directed through the bypass. One application of this feature is useful in processing certain types of returned mail in which the recipient's address has changed and the post office will no longer forward the mail. Such mail may be returned with certain information about the recipient obscured (such as the recipient's account number) and the new address printed by the post office. Presumably, one of the documents in the envelope, such as the first document, will have the recipient's account number. Since the documents in the envelope are returned documents, there is probably no reason to image all of the documents. However, it would be desirable to image the envelope (showing the new address) and one of the documents (showing the customer account information). Accordingly, the operator may input information specifying that the documents are to be processed without separating the documents. The retard controller 119 is turned so that the retard is disengaged. The packet of documents is then placed on the conveyor 100, as well as the envelope. The packet of documents is then processed through the scanner together as if it is a single document, so that the top face of the top document is scanned. The packet of documents and the envelope are then directed out the bypass 165. Alternatively, if both addresses are viewable on the face of the envelope, the envelope can simply be imaged without removing any of the documents. The envelope and the enclosed contents are then directed out the bypass. The operator may select whether the envelope should be processed alone or with one of the enclosed documents. Before processing the envelope, the operator identifies how the envelope is to be processed, inputs the information into the system, such as by a button, keyboard, mouse or otherwise, and then drops the envelope (and document if appropriate) onto the conveyor.

Maintaining Transactional Integrity

All of the documents in an envelope are referred to as a transaction. In addition, in some applications the envelope may be considered part of the transaction. It is often important to ensure that documents from a first transaction do not get mixed with documents from a second transaction. This is referred to as maintaining transactional integrity.

Because each envelope defines the boundaries for each transaction, and the documents are initially contained within envelopes, the boundaries for each transaction are known. However, once the documents are removed from an envelope and are placed onto the drop conveyor it is possible for the documents from different transaction to become mixed. Accordingly, preferably steps are taken to maintain the transactional integrity after the documents are removed from the envelopes. In addition, in applications in which the documents are already extracted from the envelopes, it may require intervention from the operator to indicate the end of a transaction.

One method for maintaining the transactional boundaries is to manually indicate the beginning point of a transaction. For instance, the apparatus may include a push button or a foot pedal that the operator depresses to indicate the beginning or end of a transaction. Since the operator extracts the documents from the envelope, the operator knows which documents belong to a transaction. After the operator extracts the documents they are placed onto the drop conveyor one at the time. After the last document is placed on the conveyor, the operator indicates the end of the transaction by pressing a button (or otherwise). The next document will be processed as the first document in the next transaction.

A second method for maintaining transactional boundaries is to automatically define the transaction based on the document type. For instance, if the transactions include two types of documents, the operator places the documents onto the drop conveyor so that the second type of document is always the trailing document. Therefore, when the apparatus determines that a document is the second type of document, the apparatus assumes that the document is the last document in the transaction, and the next document processed is considered to be in a new transaction. When using this method, the document type can be determined based on different characteristics that have been determined for the documents. For instance, the apparatus can determine that a document is a check if it has a certain length and a MICR line. Therefore, if checks are the identifying document, the end of each transaction is automatically defined when the apparatus detects a document having the certain length and a MICR line.

One way to implement the second method is to use the envelope as the trailing document. An envelope is readily distinguishable from documents based on its thickness profile since envelopes generally have numerous folds that cause thickness differences along the length of the envelope. Although only the contents were imaged in the discussion above, the envelope can also be fed into the imaging station. Once the apparatus identifies a document as an envelope based on the thickness profile, the transaction is closed. If it is desired to keep the envelope, the envelope can be sorted, and the envelope image can be included in the images of the transactional boundaries. However, typically the envelope simply serves as a divider, so that the envelope is outsorted through the bypass (as discussed above), the envelope image is deleted and the document that preceded the envelope is considered to be last the document in the transaction. Alternatively, the envelope can be the leading document, so that the envelope marks the beginning of the transaction rather than the end.

In certain instances this second instance may not properly identify the transactional boundaries. For instance, using the above check example, if a transaction includes three documents and two of the documents are checks, the transaction will be split into two transactions. Accordingly, rather than automatically defining the transactional boundaries by document type, the boundaries my be defined by the transition from one type of document to another. In other words, the end of a transaction is defined by the point at which the documents transition from one type of document to another. If documents of the second type are supposed to be the trailing documents, then the apparatus assumes that when it identifies a transition from a document that is of the second type to a document that is of the first type, there is a transactional boundary. The document of the first type is assumed to be the first document in the next transaction.

Returning again to the check example, if checks are supposed to be the trailing document type, then all of the documents in a series of documents are considered to be in a single transaction until the apparatus identifies a transition from a check to a different type of document. The last check is included in the first transaction and the subsequent document is considered to be the first document in a second transaction.

A fourth method of maintaining transactional boundaries is a more automatic method that utilizes the extraction sensors. As discussed further above, the apparatus includes several sensors 75,76 that monitor the envelope at the extraction station to determine whether the contents have been extracted. Once the sensors indicate that the contents have been extracted, the envelope is automatically conveyed forwardly. This indication that the envelope is empty can be utilized to demark the transactional boundaries.

For instance, once the sensors indicate that an envelope is empty, the apparatus assumes that all of the documents that are received in the imaging sensor within a subsequent time frame are considered to be in the same transaction. Any documents after the time period are considered to be in the next transaction. For instance, the time period may be 2 seconds, so that after receiving an indication from the sensors that all of the documents are extracted from an envelope, all of the documents that are received in the imaging section in the next 2 seconds are considered to be the transaction that was extracted from the envelope.

In the second, third and fourth methods of defining the transaction, it was assumed that the transaction were determined automatically based on different characteristics. In addition, during any of these methods, the operator may manually override the determination by pressing a button or otherwise, as described in the first method.

Operator Interface

As discussed previously, the apparatus includes a touchscreen display to provide an input/output device for the operator to interface with the operation of the machine. The interface between the operator and the apparatus may be more clearly explained with reference to FIGS. 11-14, which are pictures of screen displays.

Figure 11:
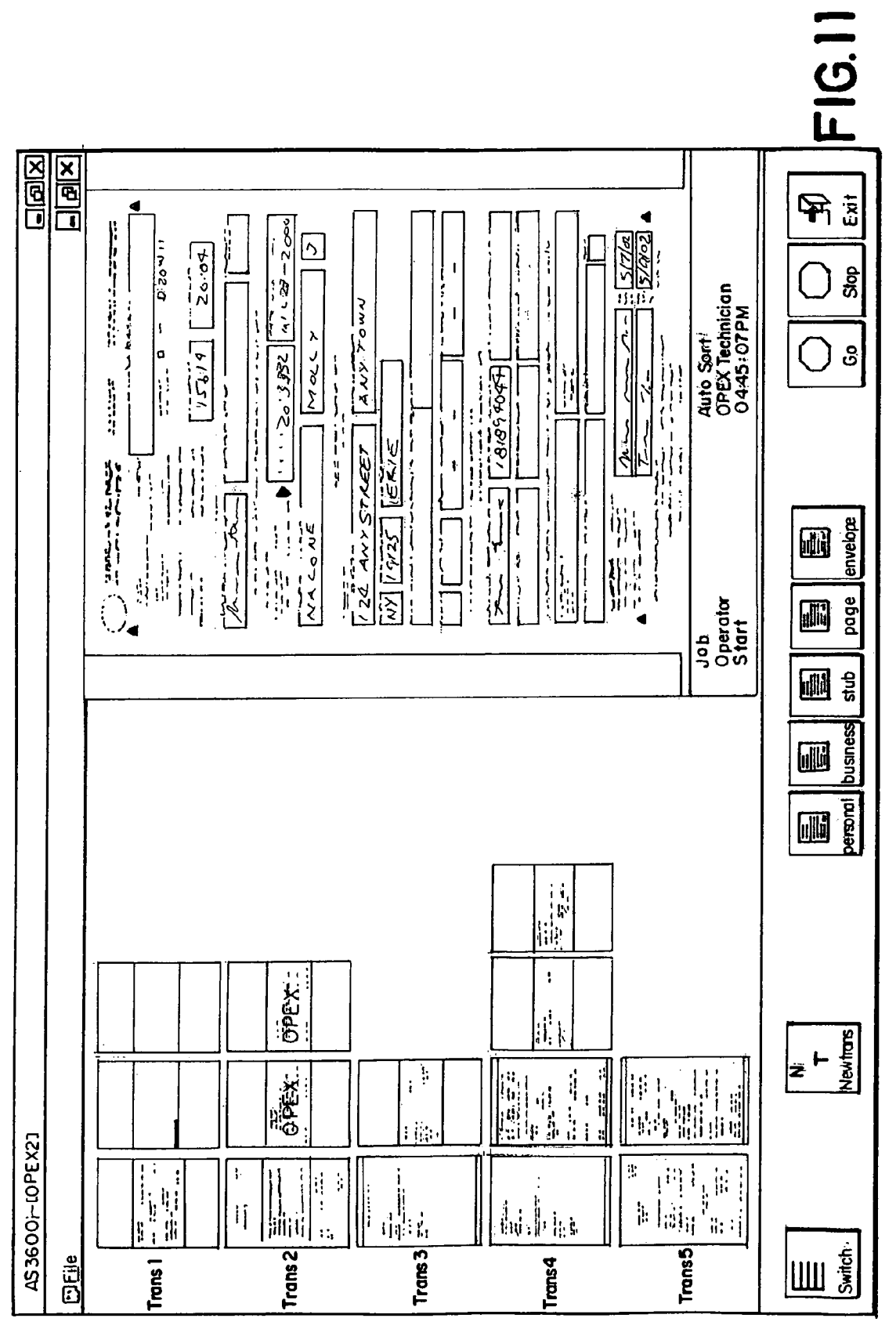

Referring first to FIG. 11, the display includes three general areas. The bottom portion of the screen provides a toolbar of control buttons. The operator can control different aspects of the operation of the apparatus with these buttons, as described further below. The second part of the display is the left side of the screen above the toolbar. This lefthand portion displays thumbnail views of the recently scanned documents. The third portion of the display is the right side of the screen above the toolbar. This right hand portion is a large view of the last document to be scanned, unless a different document is selected by the operator, as discussed further below. In addition, under the third area a window is provided in which information is displayed, such as information regarding the batch of documents.

Figure 12:
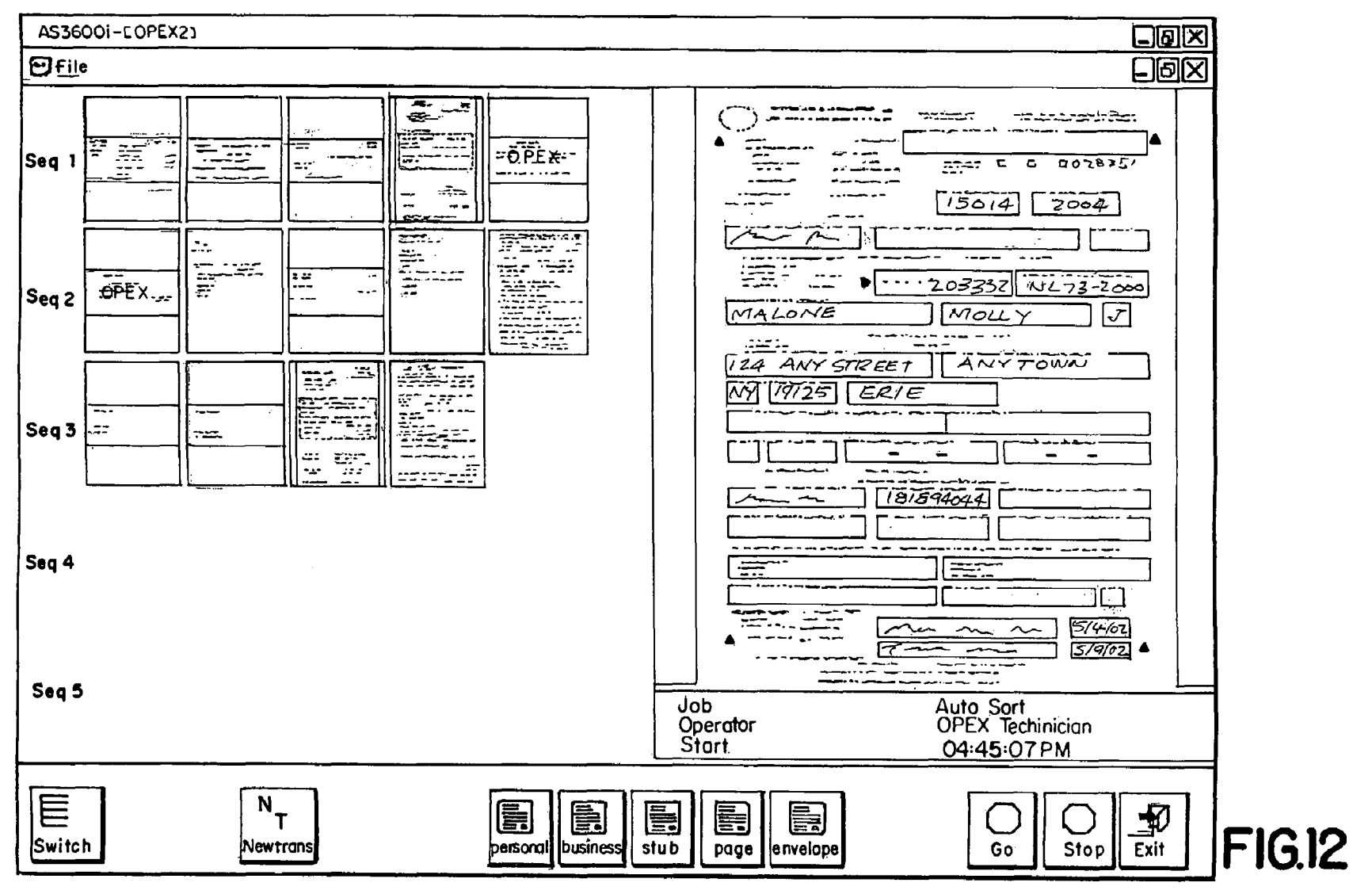
Figure 13:
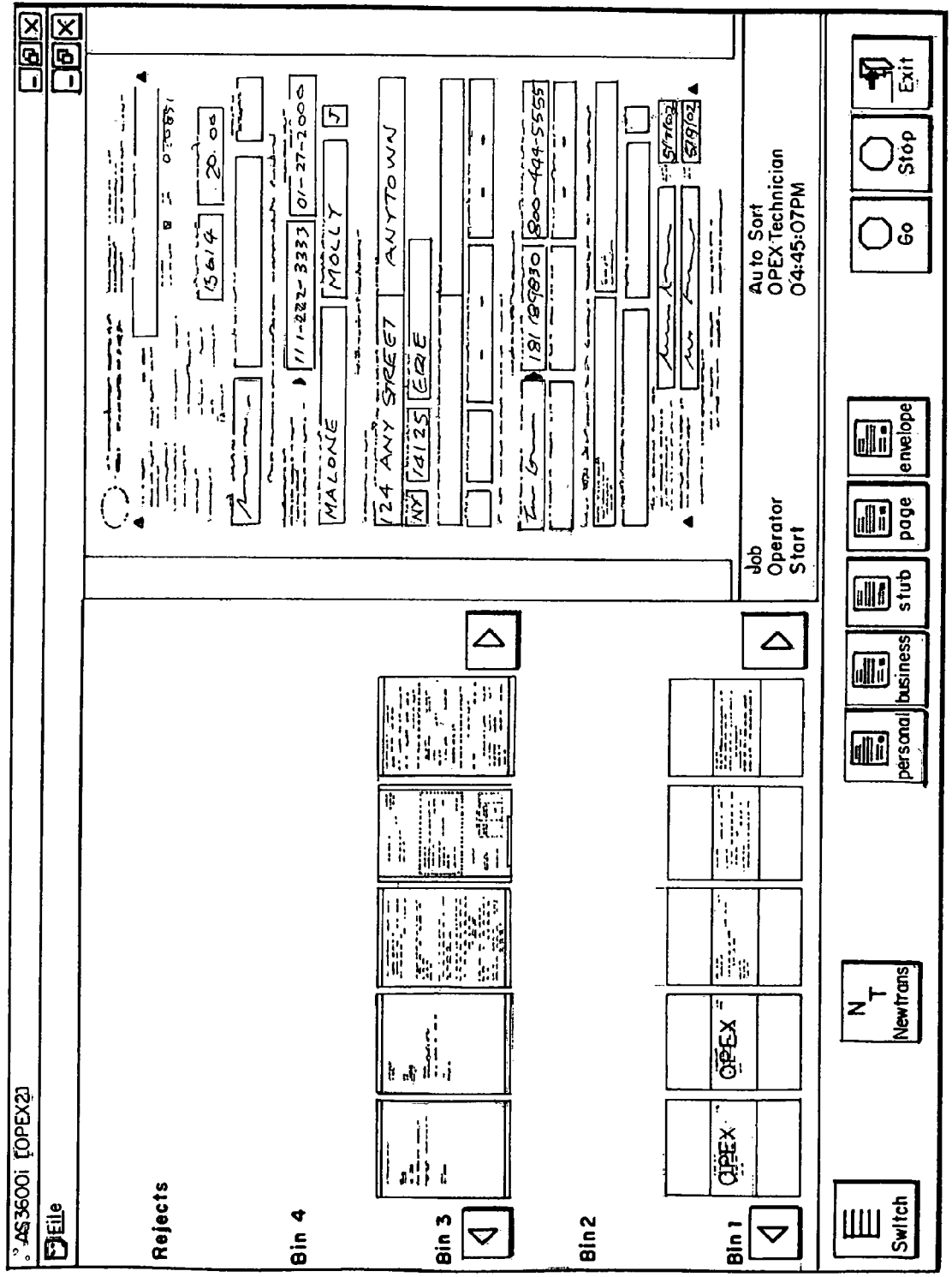
FIG. 13 is a screen shot of an operator display of the apparatus illustrated in FIG. 1, illustrating a view sorted according to bin.
Figure 14:
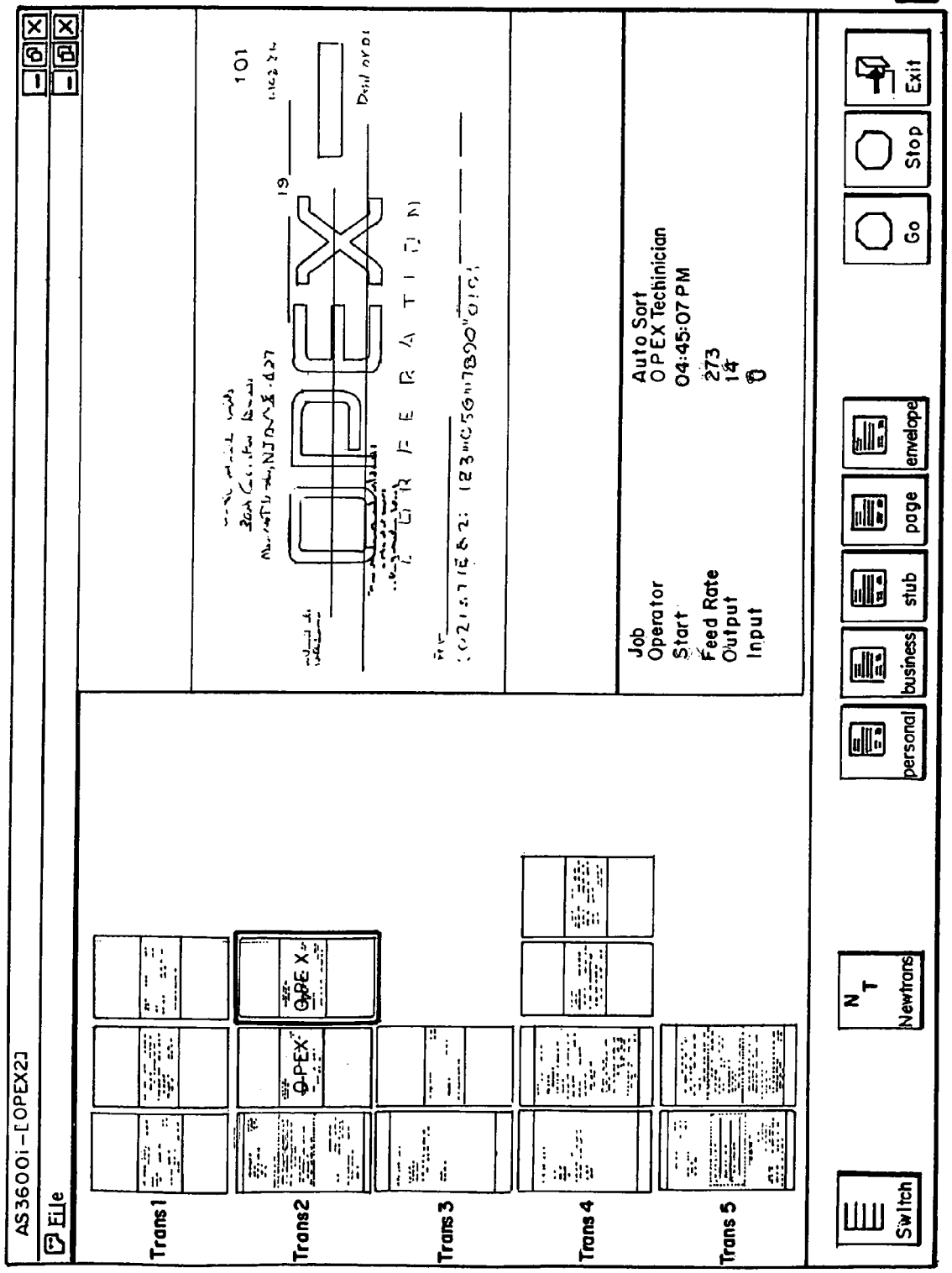
FIG. 14 is a screen shot of an operator display of the apparatus illustrated in FIG. 1, illustrating a view sorted according to transaction.

Referring to FIGS. 11-13, the thumbnail view section of the display can be displayed in one of three views. In the first view (FIG. 11), the thumbnails are organized by transaction. In other words, each row represents a transaction, so that a thumbnail of each document in a transaction is viewable in the same row. For instance, the transaction in the first row includes four documents and thumbnail views of each document are displayed in the first row. In contrast, the third transaction includes only two documents, as can be seen by the two thumbnail views in the display.

In the second view (FIG. 12), the thumbnail views are displayed according to the bins 205. The first row displays the thumbnail view for each document in the top bin, and the thumbnail views are in the same sequence that the documents are in the top bin. Similarly the second row displays the thumbnail views for the documents in the bin under the top bin, and so on through the bottom bin.

In the third view, the thumbnail views are simply displayed in the sequence in which the documents were processed. The first thumbnail in the first row represents the first document scanned in a batch, and the thumbnails continue in the first row until the end of the first row. The next document is then displayed in the leftmost position in the second row. The display of the thumbnail views continues in this pattern until all of the documents are displayed.

By touching the thumbnail view of any document, an enlarged view of the document is displayed in the right-hand viewer portion of the display. In addition, if a document is selected in one view (e.g. transaction view) and the view is changed (e.g. to bin view), the selected document is also selected in the changed view.

More specifically, if the display is in transaction view, a document in a transaction can be selected, as shown in FIG. 11 (the selected document is identified by a dark border surrounding the selected document). If the operator desires to retrieve the selected document, it would be desirable for the operator to know which bin the document is located in, and how far the document is from the top of the stack. Accordingly, after selecting the document in transaction view, the operator can switch to bin view by touching the "Switch" button on the button toolbar. The thumbnails will then be displayed according to bin, and the document that was selected in the transaction view will remain selected in the bin view so that the operator can see which bin the document is in and by counting the documents in the row that the selected document is in, the operator can determine how far the document is from the top or bottom of the bin.

Similarly, if a document is selected in bin or sequence mode, and the view is switched to a different mode, the selected document will remain highlighted after the view is switched.

The other buttons in the toolbar relate to other features of the device. For instance, as discussed above, during operation, the operator may identify the document type when the document is dropped onto the conveyor 100. Preferably, the five buttons in the center of the toolbar represent the five different types of documents being processed for a batch of documents. Accordingly, to identify the document type the operator can simply touch the appropriate button when dropping a document on the conveyor.

Further, as discussed above, the operator may manually identify the transactional boundaries. Accordingly, after the operator places the last document in a transaction onto the drop conveyor, the operator touches the "new transaction" button, thereby indicating that the next document is in a new transaction.

In addition, it may be desirable to include controls to allow the operator to specify special scanning criteria for a document. For instance, if the operator notices that a document is particularly light, the operator may want to indicate that the document should be scanned on a darker setting than usual. Similarly, the operator may want to change the image scanning from color to gray scale or vice versa, or the operator may want to change the scan resolution. To provide such control, a special handling button may be provided on the display. When the operator desires to specify some type of special handling, the operator touches the special handling button when the document is dropped onto the conveyor. A display of the different special processing options may then be displayed, thereby allowing the operator to control the scanning characteristics on a piece by piece basis if necessary.

Reject Processing

During processing, a document may be rejected for one of several reasons, such as too much skew or insufficient gap between documents for example. There are two primary modes of processing the rejected documents and the documents that were upstream from the document when it was rejected.

In the first reject processing mode, the exact sequence of all of the documents within a batch is not critical. In such a mode, the rejected piece is sorted to a reject bin or directed out the bypass 165, and the subsequent documents in the transaction are processed in accordance with the ordinary procedures discussed above. At the end of the batch, all of the rejected documents are retrieved and processed again.

In the second reject processing mode, the order of the documents either within a batch or within the transactions is important. Therefore the rejects and subsequent documents should be processed in a manner that allows the proper order of the pieces to be maintained. Accordingly, if a piece is rejected, all of the piece from the image entry feeder forward are rejected. The apparatus then prompts the operator to retrieve all of the rejected documents and re-feed the documents in the proper order to resume processing.

Editing/Re-scanning

During processing, the operator may determine that a document needs to be re-scanned. For instance, the operator may notice on the display 20 that an image was too light. The operator selects the document by touching the thumbnail image. If the operator is unsure in which bin the document is located, the operator can press the switch button and switch to bin view, which will show the operator the bin that the document is located in, as discussed previously. The operator can then retrieve the document, and then select the re-scanning option from a list of editing functions. The document is then dropped onto the conveyor and is then scanned. The newly scanned image replaces the previous image.

Similarly, if the operator notices that a document needs to be added, such as being added into a transaction that was already processed, the operator selects the insert option from a list of editing functions. The document is then dropped onto the conveyor and is then scanned. The newly scanned image is inserted into the appropriate transaction and/or into the appropriate sequence in the batch. The operator can then replace the physical document into the proper document sequence. If the documents are sorted or stored according to document sequence number, then the document is inserted into the stack of documents according to the document sequence number (i.e. the order in which the document was originally processed; not the order in which it was re-scanned). In the alternative, the documents may be sorted and/or maintained according to the document scan number (i.e. the order in which the documents are scanned). If the documents are kept according to the document scan number, then the document should be in the proper order after it is scanned.

In certain instances the operator may determine that a document image should be deleted. To do so, the operator selects the thumbnail image of the document, and then selects the delete option from a list of editing functions, so that the image is discarded.

Yet another feature is the ability to move a document from one transaction to another or within the sequence in the batch. A document can be moved in one of two ways. First, the operator can select the document by touching the thumbnail image. The operator then selects the move option from a list of editing functions. The operator is then prompted to indicate where the document is to be moved to, such as which transaction and which document in the transaction. Alternatively, preferably the operator can move the document by drag and drop, by touching the thumbnail and dragging the thumbnail across the screen to the appropriate location.

Processing Documents with Detachable Portions

Frequently, documents include a portion that is designed to be detached. Most frequently, a perforation separates the detachable portion from the body of the document. The detachable portion of the document is commonly referred to as a skirt. In some instances, the skirt may include information that is helpful for further processing of the document. For instance, a check may have a skirt that identifies the invoice numbers that correspond to the payment. When processing a batch of documents, it may be desirable to process the checks with the skirt attached, rather than removing the skirt. Further, in certain instances, the skirt should be selectively removed.

Accordingly, documents with skirts may be processed as follows. The operator treats the documents with skirts just as other documents: the documents are simply dropped onto the drop zone of the conveyor without detaching the skirt. The document with the attached skirt is then imaged at the imaging station, and sorted into one of the sort bins. After the documents are removed from the output bin, the skirts may be removed if desired. Further still, If the documents with skirts have an identifying characteristic, then the image data can be scanned for the identifying characteristic. Documents having the characteristic can then be sorted to a particular bin. In this way, the skirts can be removed in groups rather than one at a time.

Since the skirt is to be discarded, it may be desirable to discard the skirt portion of the image as well, thereby reducing the file size for the image data. Accordingly, if a document is identified as a document having a skirt, the image data may be parsed to only retain the portion of the data corresponding to the portion of the document without the skirt. Alternatively, the image data can be parsed so that the image of the skirt is in one file and the image of the remaining portion of the document is in a separate file.

The documents with skirts may also be sorted according to various characteristics on the documents. For instance, if the documents have a MICR or OCR line, the documents may be sorted according to information in the MICR or OCR line. In one application, the documents may be checks, and the MICR line may be read optically or by using a MICR reader, as discussed previously. The MICR line includes information that identifies the institution on which the check is drawn. Depending on the institution on which a check is drawn, it may be desirable to retain the skirt. Therefore, checks drawn on institutions for which the skirt should be retained are sorted to one bin, or one of several bins, while checks drawn on institution for which the skirt may be discarded are sorted into different bins. In this way, the checks for which the skirt should be removed are separated from the checks for which the skirts may be detached an discarded. By separating the documents, the skirts can be detached in groups without removing skirts that should not be detached.

In addition to sorting the documents based on various characteristics of a document, the image data may be parsed based on the various characteristics. Depending on the account identified in the MICR line, the image data may be parsed so that only the image of the checks without the skirts is retained. The scanned image data for the skirts are deleted. Similarly, based on the account identified in the MICR line of a check, the image data may be parsed into two files: one file for the check image data, one file for the skirt image data.

Assigning Reference Information

Another aspect of the apparatus 10 is the ability to assign one or more pieces of information to one or more documents. The information may be assigned to a single document, or it may be assigned to each document in a transaction, batch or entire job comprising multiple batches. An interface between the operator and the apparatus is provided so that the operator can input the reference information when necessary or desired.

One way that reference information can be assigned is according to batch. Typically, batch information is assigned prior to processing a batch of documents. Each document in the batch is then tagged with the batch information. The batch reference information can be physically or electronically tagged to the document. The reference information can be physically tagged to a piece by printing the reference information onto the piece by the printer modules 190. The reference information can be electronically tagged by associating the reference information with each piece in a data file. For instance, a data file may be produced for each document, which would include information such as the sequence number of the piece, the image data for the piece, the date and time the piece was processed and information that is electronically determined, such as a MICR line or an OCR line on the piece. The batch reference information may be included in the data file for the pieces in the batch.

Another way that the reference information can be electronically tagged to a piece is by electronically printing the information on the image data. More specifically, the reference information is added to the image data for a piece, so that when the image data is viewed, the reference information also appears. The reference information may overlay the image data so that when the image is viewed, the information appears to be printed on the document. However, more typically, the reference information is positioned adjacent the image when the image is viewed.

When tagging a batch of documents with batch reference information, it is desirable to identify the reference information before processing the documents. By identifying the batch reference information prior to processing, the reference information can readily be tagged to the documents while the documents are processed through the apparatus. In some instances it may be acceptable to identify the batch information after the batch has been processed.

The batch reference information may be identified in any number of ways. The operator may key reference information into the apparatus through a keyboard or similar input device. Alternatively, the operator may scan in the reference information. For example, the apparatus may include a hand-held bar code scanner that can be used to scan in reference information. It is also possible to identify the reference information by the processing of a document. For instance, before the first piece of mail is processed, a document with reference information printed on it may be processed through the machine. The reference information may be a bar code, a MICR line, characters that can be read using OCR or otherwise. The apparatus may scan the first piece, read the reference information and then identify the documents with the reference information.

In addition to tagging documents with reference information according to batch, documents can be tagged by transaction. A transaction includes one or more documents that were extracted from a single envelope. In certain instances it may be desirable to tag each document in a transaction with reference information that relates to the transaction. As with batch reference information, transactional reference information may be identified manually by operator input or automatically by the scanning information off of a document. After the transaction ends, the apparatus stops tagging documents with the transactional reference information.

In addition to batch and transaction bases, reference information may be tagged to a document on a document by document basis. As with the discussion of batch and transactional reference information, document reference information may be identified manually by the operator or automatically. With document reference information the information is only tagged to the specific document. However, the document may have several pages. If the document has several pages, each page is tagged with the document reference information.

As discussed above, reference information can be tagged to documents on a job, batch, transaction, or document basis. In addition, the references can be combined so that a particular document in a job could be tagged with job reference information, batch reference information, transactional reference information and document reference information. Further still, there can be several of each type of reference information. For example, a document may have a single piece of batch reference information, two pieces of transactional reference information, and two pieces of document reference information.

The following examples illustrate applications of the reference information described above. A first example illustrates a use of batch reference information. One of the benefits of scanning images of each document is that the document images can be used during subsequent processing rather than the original documents. Therefore, it may be possible to discard the documents and simply use the images. However, it may be necessary to examine an original document in the event that there is a dispute regarding the document or if the document image does not show all of the details of the document. Accordingly, it is desirable to provide an efficient method for scanning and archiving documents to facilitate retrieval of the documents at a later time if necessary.

The first step is to provide a container, such as an archive box, onto which a unique identifier is attached, such as a barcode. Before processing a batch of documents, the operator is prompted on the view screen to enter the identification number for the archive box. The operator scans the bar code using a hand held bar code scanner connected to the apparatus 10. The bar code scanner reads the bar code and decodes the bar code to determine the identification number for the archive box. Alternatively, the identification number may be printed on the archive box and the operator may manually key the box number into the system. The identification number for the box is the reference information for the batch of documents that are to be stored in the box. Other reference information may also be identified for the batch. For instance, the operator may key in information about the batch of documents such as what type of documents are in the batch or where they were received from.

After the operator identifies the batch reference information, the operator processes the documents. For instance, if the batch of documents were previously extracted from envelopes, the documents are processed by dropping the documents onto the conveyor, either alone or in packets. The documents are then scanned and discharged into the output bins, as described previously. During the processing, the documents are electronically tagged with the batch data. After processing, the documents are removed from the bin or bins and placed into the archive box. Preferably, a sequence number and the box identifier are printed onto the documents as the documents are processed, and the documents are placed into the archive box in order according to sequence.

Further processing for the processed documents can be accomplished using the image data for the documents. However, if the physical document needs to be retrieved, the data file for the document will identify the identification number for the box in which the document is located, and the sequence number for where the document is located within the box. And again, when the document needs to be replaced, the correct box and location can be readily determined since the document is tagged physically and/or electronically with the box identification number and sequence number.

In this way, a processed document can be easily stored and efficiently retrieved if necessary. At the same time, the box identification number can be identified directly off of the box and the documents can go directly into the box after processing, so that there is less likelihood of placing the wrong documents into the wrong box. Further still, if the box identification number is scanned in off of the box, such as by a bar code scanner, there is less likelihood that the wrong identification number will be entered for a box, which could lead to mis-storing a batch of documents.

A second example of using reference information is an application that uses transactional reference information. Frequently, important papers are sent via a courier that tracks the location of the package from the person shipping the package to the person receiving the package. Most typically, the packages are tracked using some type of bar code. When the documents are received and then scanned it is desirable to retain the tracking information for the package, but it is normally desirable to discard the packaging materials.

Accordingly, a batch of documents in courier envelopes, such as Federal Express, Express Mail or UPS envelopes, can be processed as follows. Before processing the documents in the envelope, the operator identifies the transactional reference information for the documents in the envelope. The operator can key in the information, but preferably, the operator simply scans the tracking bar code on the package with a bar code scanner. After the transactional reference information is identified, each document in the transaction is processed and each document in the transaction is tagged with the transactional reference information.

To ensure that the transactional reference information is associated with the proper document, it is important to ensure that the beginning and ending of a transaction are properly defined. The beginning of a transaction can be identified manually by the operator pushing a start transaction button. Alternatively, the beginning may simply be defined by the act of scanning the tracking bar code. The system then treats every subsequently processed document as a part of the transaction until the end of the transaction is somehow indicated.

The end of the transaction can be identified in one of several ways. For instance, the operator can manually depress an end of transaction button after the last document in a transaction is processed. Alternatively, the act of scanning in the next tracking bar code can indicate the end of a transaction. Specifically, after scanning a tracking bar code, the system may assume that all of the subsequent documents are part of the same transaction until the operator scans the next tracking bar code. In other words, the act of scanning the tracking bar code can operate as both an indicator of the end of the previous transaction and the beginning of the next transaction.

As described above, the transactional reference information is typically identified prior to scanning the transactional documents. The method described above included scanning the bar code for the reference information, processing a transaction, and then scanning the next bar code for the next transaction. It may be desirable to identify the reference information for the next transaction while the previous transaction is still being fed into the imaging station. Accordingly, the operator may indicate whether the reference information is for the current transaction or the next transaction. This option may be displayed on the view screen as a choice to be made before inputting the reference information.

In this way, while the machine is processing a transaction, the operator may select the next transaction option and then enter transaction reference information for the next transaction. The system will continue to process the current transaction with the previous transaction reference information. After the current transaction is done being processed, the operator drops the next transaction onto the drop conveyor and the system tags the documents with the new transactional reference information that the operator had already entered.

Another application of reference information relates to the use of document reference information. In certain instances, the operator may manually identify some information regarding a document that may not be readily identifiable from the scanned image. Prior to scanning the image, the operator identifies the information regarding the document, such as by keying the information into the system via a keyboard or other interface, such as a voice recognition system. For instance, if a document has unusual printing that does not optically scan well, someone looking at a subsequently scanned image of the document may not know that the image may not accurately reflect the document. One example is a document that has red ink, which does not scan as well as other colors. When viewing the image, it may appear that certain information is missing or incorrect. If the person viewing the image knows that the document had red ink printing, the person may more readily recognize the need to retrieve the original document, or alter the processing of the document. For example, during subsequent processing, an operator may be viewing the document image to credit a customer's account with a payment. The amount of the check may not be clear on the check because the printing on the check could not be properly scanned (e.g. too light, printed in red ink etc.). The operator may have recognized the problem with the printing, manually read the check amount, and keyed in the information as document reference information. During subsequent processing, the operator crediting the payment may use the document reference information to identify the amount to credit the customer's account.

Yet another example of using document reference information is a memo on the memo line of a check or document. A customer may write information in the memo line, such as an account number, or some indication that the document requires special processing. When scanning the documents, the operator may manually read the information and input the information as document reference information. The document reference information can be used to sort the document. For instance, the document reference information could specify that there is a change of address. All such documents may be sorted separately. Subsequently, an operator may process all of the change of address documents at once by viewing the image, and keying in the change of address information into the customer's account.

Each of the foregoing applications only discussed using a single type of reference information. However, as previously described, the different types of reference data can be used in combination. For instance, in the first example, all of the documents in a batch were tagged with batch reference information regarding the identification number for the box into which the documents were to be archived. If the batch includes a package with a tracking bar code, the operator may scan the bar code so that all of the documents in the package are identified with the tracking information. At the end of the transaction, the operator presses an end of transaction button to indicate the end of the transaction. Further, when processing one of the documents in the transaction, the operator may notice an anomaly with one of the documents. Before processing the document, the operator may input reference information for the specific document, and only that particular document is tagged with the document information.

In yet another example, a job may include two batches of documents that are mixed together, and the documents are to be tagged with the proper batch reference information. In such an instance, the proper batch reference information should be identified for each document, which can be done in one of several ways. For instance, the operator can identify batch reference information for a first batch, and the documents are tagged with the first batch reference information until some document is identified as being in the second batch. This can be done by the operator indicating that the document is one being in the second batch. The document is then tagged as being in the second batch. Similarly, subsequent documents may be tagged as being in the second batch until a document is identified as being in the first batch. Alternatively, the batch into which a document belongs may be identified on a document by document or transaction by transaction basis.

One application of the mixed batch would be in which a job of documents needs to be sorted according to certain criteria and stored into two different boxes. Before processing a job of documents, the operator may scan the first box and identify the box identification number as batch reference information for a first batch of documents. The operator may then scan the second box to identify the box identification number as batch reference information for a second batch of documents. As the documents are processed the documents are identified as being in the first batch or the second batch. The batch reference information is tagged on the respective documents and the documents are sorted into the output bins according to batch. The documents from the first batch are then removed from the appropriate bins and placed into the first box and the documents from the second batch are removed from the appropriate bins and placed in the second batch.

As mentioned previously, the batch to which a documents is identified may be determined in a number of different ways. One example in the mixed batch application is to sort documents into batches based on information on the documents. Specifically, a MICR line includes information regarding the institution from which a check is drafted. The MICR line may be read for the checks as the documents are processed, and the documents can then be sorted into batches according to the institutions. For instance, if a transaction has a check that is drafted from a first institution (or group of institutions), then all of the documents in the transaction are identified with first batch reference information. If a transaction has a check that is drafted from a second institution (or group of institutions), then all of the documents are identified with second batch reference information.

As can be seen from the foregoing examples, the apparatus 10 provides flexibility in processing documents in an automated manner, while allowing for efficient intervention from the operator to supplement or modify the information stored for the documents. Several applications have been described, however the flexibility of the features of the apparatus allow it to be used in a wide variety of applications using different combinations of different features. Accordingly, although particular embodiments and applications of the apparatus have been illustrated and described, it is not intended to be limited to the specific embodiments and applications.

The invention claimed is:

1. A method for processing documents having folds, comprising the steps of:
   manually dropping a plurality of documents having folds onto a generally horizontal conveyor, wherein the documents are in a generally horizontal orientation when the documents are dropped onto the conveyor;
   serially feeding the documents from the conveyor to a scanner, wherein the documents are in a generally horizontal orientation when the documents are conveyed to the scanner;
   automatically flattening folds of the documents prior to the documents entering the scanner; and
   scanning the documents at the scanner to obtain optical image data for the documents.

2. The method of claim 1 comprising the step of storing the image data on a non-volatile storage medium.

3. The method of claim 2 wherein the step of storing the image data comprises exporting the image data to a file server.

4. The method of claim 1 wherein the documents are contained within an envelope and the method comprises the steps of:
   feeding the envelope to a cutting station; and
   severing one or more edges of the envelope at the cutting station.

5. The method of claim 4 comprising the step of pulling apart the envelope to present the documents for removal from the envelope.

6. The method of claim 5 comprising the step of reorienting the documents as the documents are conveyed to the scanner.

7. The method of claim 6 wherein the step of reorienting comprises reorienting the documents as the documents are conveyed in a generally horizontal orientation.

8. The method of claim 5 comprising the step of manually grasping the presented documents and withdrawing the documents from the severed envelope.

9. The method of claim 1 comprising the steps of:
   transporting the document to a feeder operable to maintain the document in a fixed position; and
   feeding the document from the feeder to the scanner.

10. The method of claim 9 comprising the step of reorienting the documents during the step of transporting the documents to the feeder.

11. The method of claim 10 wherein the step of reorienting the documents comprises reorienting the documents while the documents are in a generally horizontal orientation.

12. The method of claim 1 comprising the step of analyzing the image data to determine a characteristic of the documents.

13. The method of claim 12 comprising the step of sorting the documents into one of a plurality of bins in response to the determined characteristic.

14. The method of claim 1 wherein the step of flattening comprises flattening folds in the documents along substantially the entire length of the documents prior to the documents entering the scanning.

15. The method of claim 1 wherein the step of flattening comprises:
   positively entraining a first end of each of the documents; and
   allowing portions of the documents to slide relative the first end as the documents pass through the flattening element.

16. The method of claim 1 wherein the step of serially feeding the documents form the conveyor to the scanner comprises the step of conveying the documents in a generally horizontal orientation.

17. The method of claim 16 wherein the step of conveying the documents comprises conveying the documents in a generally horizontal orientation while the documents have folds.

18. The method of claim 1 wherein the step of flattening folds of the documents comprises flattening folds of the documents while the documents are in a generally horizontal orientation.

19. The method of claim 1 comprising the step of bending the documents after the step of scanning the documents.

20. The method of claim 1 wherein the documents have folds such that the documents comprise first and second parts and the first and second parts are transverse one another.

21. The method of claim 20 wherein the step of flattening folds comprises the step of vertically displacing the first part of a document relative to the second part of the document while the document is in a generally horizontal orientation.

22. The method of claim 21 wherein the step of vertically displacing comprises displacing the first part of the document vertically downwardly relative to the second part of the document.

* * * * *